United States Patent
Yin et al.

(10) Patent No.: US 9,321,433 B2
(45) Date of Patent: Apr. 26, 2016

(54) METHOD FOR QUICKLY SUPPLYING ELECTRIC ENERGY TO ELECTRIC VEHICLE AND POWER SUPPLY DEVICE THEREOF

(76) Inventors: Xuejun Yin, Shandong (CN); Xiangfei Kong, Shandong (CN); Boting Yin, Shandong (CN)

(*) Notice: Subject to any disclaimer, the term of this patent is extended or adjusted under 35 U.S.C. 154(b) by 887 days.

(21) Appl. No.: 13/511,926

(22) PCT Filed: Oct. 21, 2010

(86) PCT No.: PCT/CN2010/077937
§ 371 (c)(1),
(2), (4) Date: Sep. 13, 2012

(87) PCT Pub. No.: WO2011/063689
PCT Pub. Date: Jun. 3, 2011

(65) Prior Publication Data
US 2012/0326665 A1    Dec. 27, 2012

(30) Foreign Application Priority Data
Nov. 27, 2009  (CN) .......................... 2009 1 0310567

(51) Int. Cl.
*H02J 7/00*   (2006.01)
*B60S 5/06*   (2006.01)
(Continued)

(52) U.S. Cl.
CPC .................. *B60S 5/06* (2013.01); *B60L 3/0046* (2013.01); *B60L 3/0069* (2013.01); *B60L 11/007* (2013.01);
(Continued)

(58) Field of Classification Search
CPC ................... A61B 17/00491; A61F 2210/009; B60L 11/007; B60L 11/1801; B60L 11/1824; B60L 11/1877; H02J 2007/0062; H02J 7/0042; H02J 7/0045; Y02T 10/7005; Y02T 10/705; Y02T 10/7088; Y02T 90/121

USPC .................................................. 320/106–115
See application file for complete search history.

(56) References Cited

U.S. PATENT DOCUMENTS

| 2007/0087266 A1* | 4/2007 | Bourke et al. ................ 429/159 |
| 2008/0187829 A1 | 8/2008 | Brand |
| 2012/0326665 A1* | 12/2012 | Yin et al. ...................... 320/109 |

FOREIGN PATENT DOCUMENTS

| CN | 1212933 A | 4/1999 |
| CN | 2337680 Y | 9/1999 |

(Continued)

OTHER PUBLICATIONS

Official Action (with English translation) for Japanese Patent Application No. 2012-540264, dated May 13, 2014, 9 pages.

(Continued)

*Primary Examiner* — Binh Tat
(74) *Attorney, Agent, or Firm* — Sheridan Ross P.C.

(57) ABSTRACT

A method of quickly supplying electric energy to electric vehicles and the power supply device thereof are provided. The method includes providing a rechargeable battery pack on an electric vehicle and providing a battery replacement device, a charging room and a battery storeroom in a power exchange station. The rechargeable battery pack includes a battery box and standardized standard battery units. The standard battery units are located in the battery box during operation, and are capable of being smoothly loaded into and unloaded from the battery box along the guiding rails. The rechargeable battery pack is pre-installed in the electric vehicle and the drained standard battery units within the battery box are replaced with fully-charged standard battery units upon payment when the electric vehicle in need of electric power supply is driven into the power exchanging station.

22 Claims, 16 Drawing Sheets

(51) Int. Cl.
*B60L 11/18* (2006.01)
*H01M 2/10* (2006.01)
*B60L 3/00* (2006.01)
*B60L 11/00* (2006.01)

(52) U.S. Cl.
CPC ......... *B60L 11/1801* (2013.01); *B60L 11/1822* (2013.01); *B60L 11/1824* (2013.01); *B60L 11/1874* (2013.01); *B60L 11/1877* (2013.01); *B60L 11/1879* (2013.01); *H01M 2/1077* (2013.01); *B60L 2200/12* (2013.01); *B60L 2200/18* (2013.01); *B60L 2230/16* (2013.01); *B60L 2240/545* (2013.01); *B60L 2270/145* (2013.01); *H01M 2/1083* (2013.01); *Y02T 10/705* (2013.01); *Y02T 10/7005* (2013.01); *Y02T 10/7088* (2013.01); *Y02T 90/121* (2013.01); *Y02T 90/124* (2013.01); *Y02T 90/128* (2013.01); *Y02T 90/14* (2013.01); *Y02T 90/163* (2013.01)

(56) References Cited

FOREIGN PATENT DOCUMENTS

| | | |
|---|---|---|
| CN | 1239927 | 12/1999 |
| CN | 1479403 A | 3/2004 |
| CN | 1493475 A | 5/2004 |
| CN | 1721239 A | 1/2006 |
| CN | 1725541 A | 1/2006 |
| CN | 200959356 Y | 10/2007 |
| CN | 101289056 A | 10/2008 |
| CN | 201189858 Y | 2/2009 |
| CN | 101522447 A | 9/2009 |
| GB | 2295264 A | 5/1996 |
| JP | 04-052572 | 2/1992 |
| JP | H05-159768 | 6/1993 |
| JP | 07-172190 | 7/1995 |
| JP | 09-259940 | 10/1997 |
| JP | 11-040211 | 2/1999 |
| JP | 11-129167 A | 4/1999 |
| JP | 2000-67835 | 3/2000 |
| JP | 2000-340197 | 12/2000 |
| JP | 2003-226142 | 8/2003 |
| JP | 2009-137366 | 6/2009 |
| WO | WO 2009/011162 | 1/2009 |

OTHER PUBLICATIONS

International Search Report prepared by The State Intellectual Property Office, the People's Republic of China, on Feb. 10, 2011, for International Application No. PCT/CN2010/077937.
Official Action with English Translation for China Patent Application No. 200910310567.8, dated Nov. 22, 2012, 9 pages.
Official Action with English Translation for China Patent Application No. 200910310567.8, dated Jul. 10, 2013, 12 pages.
Official Action with English Translation for China Patent Application No. 200910310567.8, dated Dec. 27, 2013, 6 pages.
Official Action with English Translation for Japan Patent Application No. 2012-540264, dated Jan. 6, 2015, 8 pages.

* cited by examiner

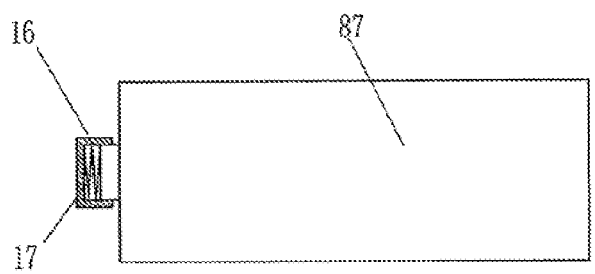 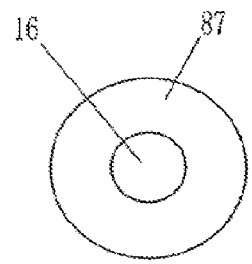
FIG. 1A  FIG. 1B
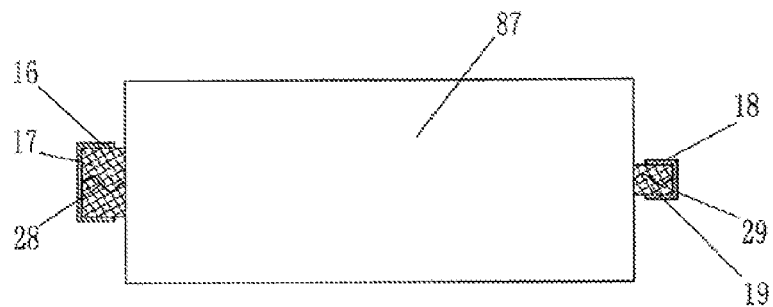 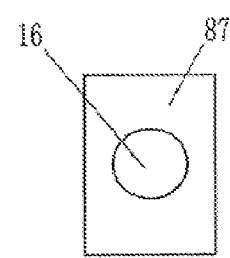
FIG. 2A  FIG. 2B
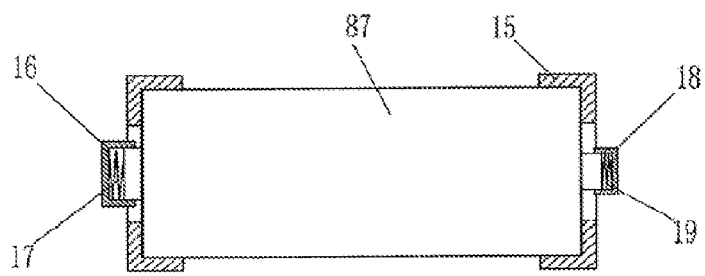 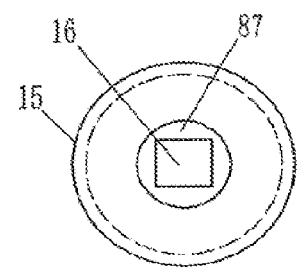
FIG. 3A  FIG. 3B
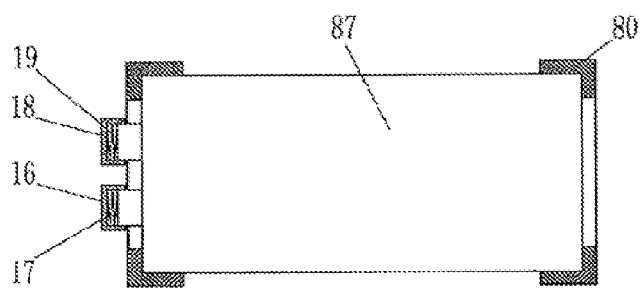 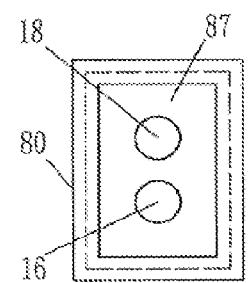
FIG. 4A  FIG. 4B

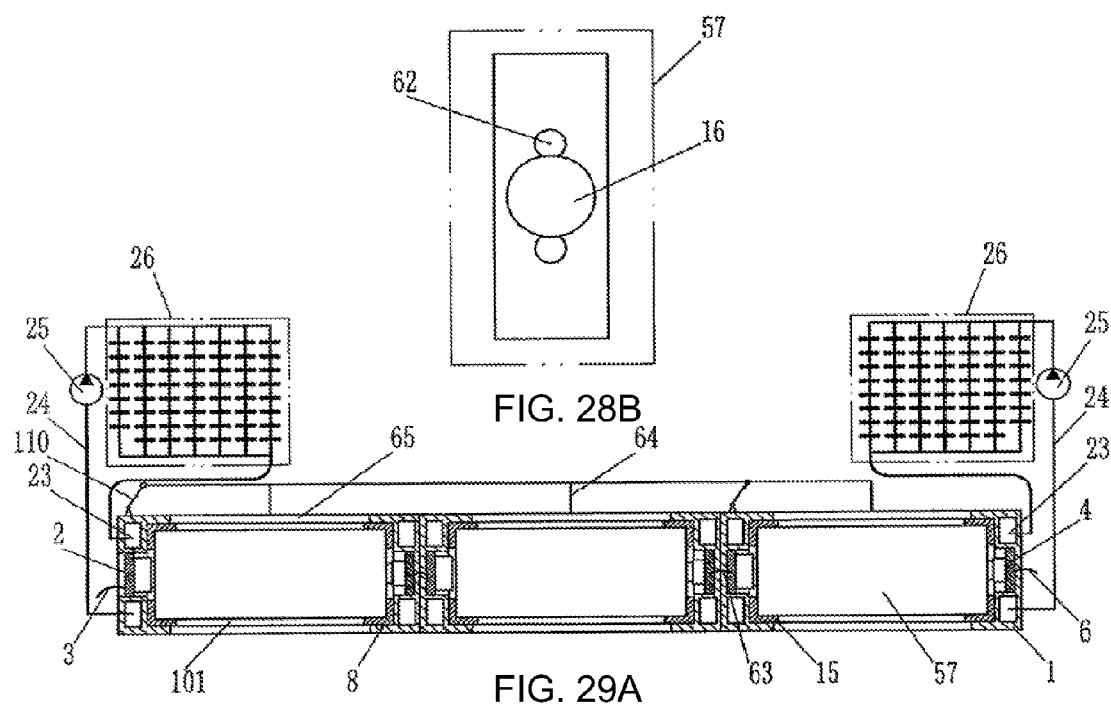
FIG. 28B
FIG. 29A
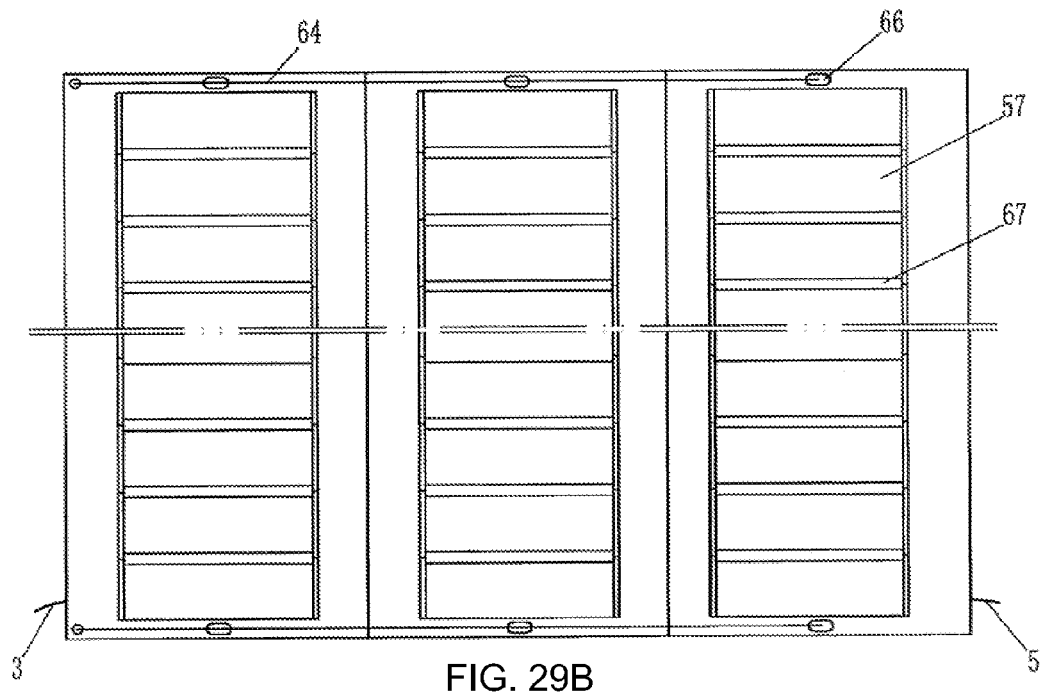
FIG. 29B

METHOD FOR QUICKLY SUPPLYING ELECTRIC ENERGY TO ELECTRIC VEHICLE AND POWER SUPPLY DEVICE THEREOF

CROSS REFERENCE TO RELATED APPLICATIONS

This application is a national stage application under 35 U.S.C. 371 of PCT Application No. PCT/CN2010/077937 having an international filing date of 21 Oct. 2010, which designated the United States, which PCT application claimed the benefit of China Application No. 200910310567.8 filed Nov. 27, 2009, the entire disclosure of each of which is incorporated herein by reference.

TECHNICAL FIELD

The invention belongs to transportation area and relates to energy supply to electric vehicles, in particular to a method for quickly supplying electric energy to electric vehicle and power supply device thereof.

BACKGROUND

With the progress of science and technology as well as development of economies, living and working spaces of human-beings are constantly expanding, making various vehicles indispensable to daily commutes. In the past, energy sources of vehicles mainly compose of petroleum products and all kinds of gases. However, with diminishing petroleum and gas resources and worsening of noise contaminations, atmosphere contaminations as well as global warming, it becomes a consensus to people to develop and utilize eco-friendly alternative energy resources and decrease $CO_2$ emissions. In this context, electric energy is widely used in power supply of vehicles as an eco-friendly, highly efficient and reliable energy. Electrical vehicles such as various electric bicycles, electric cars and buses, and trolleys are increasingly popular in future development of transportation vehicles. A common problem for electric-only vehicles powered by rechargeable batteries is that, unlike various petroleum/gas products that may be quickly supplied in fuel stations, it usually takes a few hours to recharge a typical battery for vehicle use, which significantly limits the popularization of electric vehicles. In order to solve the above problem, a method of quickly replacing large size storage battery packs and the device thereof are disclosed in the application No. 200810006771.6. According to this disclosure, so-called high voltage battery packs or full-voltage battery packs are typically used as replacement units. The battery packs are of large weights and volumes in order to facilitate replacement. The inner spaces of the electric vehicles vary greatly from one to another as of the different geometries of electric vehicles of different models or brands. It is since difficult to standardize the models and specifications of the batteries when employing high voltage storage batteries of large sizes. Consequently, it is impossible to cover most of the vehicle models available in the market with a limited number of battery models. Furthermore, the storage battery packs of different geometries and sizes increases the difficulty of building electric energy supplement stations similar to fuel stations. It then becomes extremely difficult to quickly supply electric energy to various electric vehicles by replacing storage batteries, which in turn limits the popularization of the electric vehicles by a further step. Currently, researches on related technologies still focus on how to recharge the large size storage batteries quickly, but a charging time of around 10-20 minutes is expected even in a quick charge mode. As a result, a large amount of spaces are needed to charge a large number of vehicles simultaneously, which obviously hurdles the construction of energy supply stations similar to fuel stations in a broader scale that is required for popularization of electric vehicles. In addition, safety cautions in aspects such as storage, applications and the like are required at a high level for employing storage batteries of high voltage and large capacity, which to some extent increases the operation costs. There are urban wired electric vehicles equipped with supporting pantograph systems to supply electric energy, however, as the construction of pantograph systems not only takes a significant amount of urban spaces, but also bring in various problems including defacing urban views and increasing operation costs, the outlook of such systems is thus not optimistic.

SUMMARY

The object of the present invention is to overcome the above mentioned disadvantages by providing a method of quickly supplying electric energy to electric vehicles applicable to quick replacement of rechargeable batteries of battery packs of various electric vehicles available in the market without supporting pantograph systems.

The method of quickly supplying electric energy to electric vehicles according to the present invention comprises the following steps: providing a rechargeable battery pack on an electric vehicle; providing a battery replacement device, a charging room and a battery storeroom in a power exchange station; wherein the rechargeable battery pack comprises a battery box and standardized standard battery units, with the model, size and shape of the standard battery units being applicable to the differently-shaped battery boxes of most of the electric vehicles available in market, and the only differences between the standard battery units of the battery boxes of the electric vehicles of different models being in models, and/or number and/or battery arrangements of the standard battery units, and/or serial and/or parallel connections between the battery units; at least one battery chamber accommodating standard battery units is provided in the battery box, guiding rails being provided in the battery chamber along the battery loading direction, multiple docks for accommodating standard battery units are provided in the battery chamber along the battery loading direction; the standard battery units are located in the battery box during operation, and may be smoothly loaded into and unloaded from the battery box along the guiding rails; the electrodes of the standard battery units are provided on the sides of the loading direction and contact the electrode contact rails when the standard battery units are mounted in the proper position; the electrode contact rails are connected via fixed serial and/or parallel circuits; the battery pack may reach the nominal voltage of the battery pack and the capacity of the battery pack as needed upon properly mounting of all the fully charged standard battery units; the said rechargeable battery pack is pre-installed in the electric vehicle, and the drained standard battery units within the battery box are replaced with fully-charged standard battery units upon payment when the electric vehicle in need of electric power supply is driven into the power exchanging station. Typically, the method of quickly supplying electric energy to electric vehicles according to the present invention comprises the following steps:

1) the electric vehicle is driven into the power exchange dock of the power exchange station; the driver orders standard battery units to be replaced according to model and number of the standard battery units needed. The battery box is switched to a replacement state, releasing the positional locking of the standard battery units within the battery box;

2) the drained standard battery units within the battery box of the electric vehicles needed to be replaced are replaced with fully-charged standard battery units using the battery replacement device, according to the ordered number of the batteries;

3) the model, number and price of the standard battery units being loaded are displayed on the battery replacement device synchronously;

4) after replacement of the drained standard battery units within the battery box, the battery replacement device is moved away, and the standard battery units in the battery pack are locked again, the electric power supply to the electric vehicle is since completed;

5) the standard battery units are in proper contact with the electrode contact rails upon entering and positioning of all the standard battery units in the battery box, and a battery pack nominal voltage and a battery pack capacity required are achieved through serial and/or parallel combinations fixedly provided between the electrode contact rails;

6) during the above period, the driver pays for the batteries according to the ordered number of the batteries to be replaced or the driver pays according to the actual number of the replaced batteries displayed;

7) the drained standard battery units replaced are transferred to the charging room for recharging, and the fully-charged standard battery units are transferred to the battery storeroom for further use.

When the method of quickly supplying electric energy to electric vehicles according to the present invention is used, a battery replacement device is employed to replace the drained standard battery units required to be replaced within the battery box of the electric vehicle with fully charged standard battery units. The process may be conducted specifically as described below depending on the different structures of the battery box: (1) In case that an inlet for standard battery units is provided on one end of the battery chamber within the battery box, and an outlet for standard battery units is provided on the other end of the battery chamber: the feeding port of the battery replacement device is docked to the inlet of the battery chamber of the electric vehicles after releasing of the positional locking of the standard battery units within the battery box; the battery replacement device is started to load the fully-charged standard battery units one by one through the inlet of the battery chamber according to the ordered model and number of the standard battery units meanwhile unloading the drained standard battery units within the battery chamber through the outlet of the battery chamber one by one; for the battery box with multiple battery chambers, standard battery units in these battery chambers may be loaded and unloaded simultaneously to increase the efficiency; (2) in case that only one common inlet and outlet port for loading and unloading the standard battery units is provided in one and the same battery chamber of the battery box, the recovery port of the battery replacement device is docked to the inlet and outlet port of the battery chamber of the battery box after releasing of the positional locking of the standard battery units within the battery box; the standard battery units within the battery chamber are unloaded through the inlet and outlet port of the battery chamber one by one; and then, the feeding port of the battery replacement device is docked to the inlet and outlet port of the battery chamber, the fully-charged standard battery units are loaded one by one through the inlet and outlet port of the battery chamber according to the ordered model and number of the standard battery units; similarly, standard battery units in multiple battery chambers may be loaded and unloaded simultaneously to increase the efficiency when the battery box is provided with multiple battery chambers.

According to the method of the present invention, various available batteries including lead-acid storage battery, lead acid gel battery, metal hydride/nickel battery, lithium-ion battery or iron oxide lithium battery etc. may be used to provide power to electric vehicles, therefore, the said standard battery units may be any of the above mentioned rechargeable elementary battery unit. When used herein, the term "elementary battery unit" refers to individual battery units that may not be disassembled any further. Preferentially, shapes of the elementary battery units may be rectangular or cylindrical to facilitate manufacturing and arrangement in combination, of course it may be of any other shape.

In addition to use the standardized available rechargeable batteries as standard battery units directly, in order to maintain effective contacts between the electrodes of the standard battery units and the electrode contact rails during operation, the second object of the present invention is to provide a standard battery unit applicable to the method of quickly supplying electric energy to electric vehicles according to the present invention, the standard battery unit comprising an elementary battery unit, wherein an elastic extension structure made of a metal spring or an elastic material is provided on the electrode of the elementary battery unit, the elastic material including rubber or elastic polyurethane material etc.

Furthermore, in addition to application using elementary battery units directly, in order to increase the efficiency and facilitate replacement and application, the third object of the present invention is to provide another standard battery unit applicable to the method of quickly supplying electric energy to electric vehicles according to the present invention, the said standard battery unit comprising a plurality of elementary battery units connected in series or in parallel and disposed in a standard enclosure not to be disassembled during operation, wherein electrodes are provided on the standard enclosure. In order to facilitate connecting with external circuits, the electrode of said standard battery unit may also be provided with an elastic extension structure made of a metal spring or an elastic material, wherein the elastic material includes rubber or elastic polyurethane material etc. The shape of the standard enclosure may be preferentially provided as rectangular or cylindrical. In addition, the application procedure is within the life span of the battery under typical operation. The technical solution employing the standard enclosure facilitates ease battery replacement and may be more practical considering the voltage, capacity as well as weight and size of the battery. It may be easier to be disposed in a complex-shaped battery box compared to the full voltage large size batteries, thereby fully utilizing the spaces available in the electric vehicles; it may also be beneficial to further decrease the electric energy charging time of the electric vehicles compared to the elementary battery unit. The electrode of the standard battery unit according to the present invention is provided on the side of the loading direction of the standard battery unit.

Other than providing the electrodes of the standard battery unit on one and the same end, the positive and the negative electrodes of the standard battery unit may be provided on two ends of the standard battery unit respectively, making the positive and the negative electrodes protrude from the respective end faces of the standard battery unit, which furthermore facilitates the effective connection between the standard battery unit and the external power supplying circuit. In addition, in order to prevent the accidental damages by external impacts, an elastic cushion pad layer may be provided on the corner or protrusion of the standard battery unit according to the present invention. In addition, a wear-resistant pad layer is provided at the position of the standard battery unit according to the present invention corresponding to the guiding rails of the battery box in order to be used in the method of quickly supplying electric energy to electric vehicles according to the present invention, such that the direct wear applied to the standard battery unit by the guide rails is mitigated, preventing the standard battery unit from being damaged due to excess wear during repeated loading and unloading procedures, thereby increasing the life span of the products.

The fourth object of the present invention is to provide a battery box applicable to the method of quickly supplying electric energy to electric vehicles and various standard battery units according to the present invention, comprising a battery box body, at least one battery chamber capable of accommodating a plurality of standard battery units being arranged in the battery box body, with guiding rails provided in the battery chamber along the battery loading direction and a plurality of docks for standard battery units provided in the battery chamber along the battery loading direction. A battery locating mechanism is provided in the battery box, and electrode contact rails directly contacting electrodes of the standard battery units are provided in the battery chamber on the sides of battery loading direction, with the electrode contact rails comprising an anode contact rail and a cathode contact rail, and at least one anode contact rail and at least one cathode contact rail being provided with or connected to an output port for connecting with the external circuit respectively. The output port may be of various forms, such as a plug socket, a plug or a wire etc. In the case with the provision of a plurality of anode contact rails and/or cathode contact rails, the rails may be connected with each other via fixed serial and/or parallel circuits. It has to be pointed out that the serial and/or parallel circuit refers to any of a serial circuit, a parallel circuit or a serial and parallel circuit.

It also has to be explained that, despite the fact that various currently available batteries may be directly used as standard battery units in the battery box of the present invention, standard battery units mentioned above in connection with the second and the third objects of the present invention may also be used. Therefore, unless otherwise stated, the standard battery units herein is a general term covering both the standard battery units comprising the currently available batteries and the standard battery units of the second and the third objects of the present invention. For the purpose of simplicity, in the following description, sometimes "batteries" are used to describe the standard battery units comprising the currently available batteries and those of the second and the third objects of the present invention collectively.

Based on actual needs, an inlet for standard battery units may be provided on one end of each of the battery chambers of the battery box of the present invention, and an output for standard battery units may be provided on the other end; or, only one common inlet and outlet port for both loading and unloading the standard battery units may be provided for one and the same battery chamber within the battery box. In addition, in order to prevent for accidental dropping of the batteries during operation or invasion of water or other foreign matters, an openable protection cover may be provided at the inlet, the outlet or the inlet and outlet port of the battery chamber. The protection cover and the battery box body may be connected with fasteners, or with bayonet means, hinge means, locking means or threads. In order to prevent invasion of water or foreign matters into the battery chamber causing failures such as shorts or openings of circuits, sealing elements or sealing structures may be provided between the protection cover and the battery chamber body if necessary, with the sealing elements comprising sealing covers, sealing pads, sealing rings or sealing strips etc. and the sealing structures comprising bayonet structures etc.

The electrode contact rail of the battery box of the present invention is provided on the side of the battery loading direction, at the positions corresponding to the battery electrodes. The battery electrodes are in proper connection with the electrode contact rails when the standard battery units are disposed in position, the serial connection and/or parallel connection of the electrode contact rails are pre-determined and fixed and ready for the battery units, the desired battery pack voltage and the battery pack capacity may be achieved when the batteries are disposed in position properly. The electrode contact rail within the battery box of the present invention is provided in various forms, by way of example, at least one electrode contact rail within each of the battery chambers may be made of a good conductor with flexural resilience in the direction of contacting with the battery electrodes, and connected to the battery box body with an elastic material even more softer than that of the good conductor, an insulate material layer may also be provided between the electrode contact rail and the battery box body when desired; or, at least one electrode contact rail within each of the battery chambers is made of a relatively rigid good conductor and an elastic element is provided between the electrode contact rail and the battery box body, an insulate material layer may also be additionally provided between the electrode contact rail and the battery box body when desired; otherwise, the electrode contact rail may move or rotate relative to the battery electrode, i.e., the electrode contact rail is not arranged fixedly, but maintained in contact or separate with the battery electrodes as desired. A proper voltage or total electric energy capacity may be achieved by controlling the number of the batteries provided in the battery box or serial or parallel connections and the combination thereof between the batteries, depending on the different models and loads of the electric vehicles. In order to achieve this goal, the anode contacts and the cathode contacts within the battery box may be provided in segments correspondingly, the serial connection and/or parallel connection between various batteries may be achieved by arranging the connections of the segments of the electrode contacts differently. In such way, the anode contacts and the cathode contacts in segments may form battery sub-packs, a proper voltage and electric energy capacity may be achieved by the combination of the serial and/or the parallel connections between the battery sub-packs.

The guiding rail of the present invention may be a slide guiding rail or a rolling guiding rail. A typical rolling guiding rail comprises rollers, or comprises rollers and a guiding conveyor belt, or of course any other type of rolling guiding rails. The slide guiding rail is also of various types, it may be a guiding strip fixed within the battery chamber, or concave-convex guiding structures provided on the side wall of the battery box body. Same functions may be realized as long as position limiting and guiding of the batteries are enabled. In order to prevent shocks to batteries due to bumping in vehicle traveling, thus causing loosening arcs or damages to batteries, an elastic cushion vibration-absorption pad layer may be provided between the guiding rail and the battery box body, the pad layer may be made of elastic materials such as rubber, elastic foaming material or elastic polyurethane material. Without affecting the function of absorbing vibrations, adverse effects on the heat dissipation of the batteries when applying such technical solution can be avoided if the elastic cushion pad layers are not arranged on corners or other protrusions of the standard battery units of the present invention.

In order to facilitate battery loading into or unloading from the battery box, a driving mechanism for loading and unloading the battery is provided in the battery box of the present invention. The loading and unloading driving mechanism may comprise a control system, a driving motor, a deceleration device and a transmission device, the transmission device being in form of a belt drive mechanism, a sprocket drive mechanism, a rack-pinion drive mechanism, a worm-gear drive mechanism or a ball screw drive mechanism; the loading and unloading driving mechanism may also comprise a control system, a control valve and a cylinder or hydraulic tank.

In order to easily locate the batteries within the battery box and prevent the batteries within the battery box from moving or displacing unintentionally, a battery locating mechanism is provided in the battery box of the present invention. The battery locating mechanism is a mobile stop that may protrude into and retract from the battery chamber. The mobile stop may be controlled to protrude into or retract from the battery chamber at any time to positionally lock or unlock the standard battery units within the battery chamber. In such way, locking the battery position within the battery box may be enabled in cooperation with other structures such as the guiding rails.

In addition, in order to prevent the adverse effects of reversing the anode and the cathode of the standard battery units during loading, an automatic identification error-proof device of the electrodes of the standard battery units is provided in the battery chamber within the battery box. The automatic identification error-proof device may be in various forms, including a different sized chamber structure design of battery box body for different sized electrodes, a protrusion or pin structure operated in cooperation with recesses on the standard battery units and fixed within the battery chamber, or a baffle with holes shaped to fit the specific appearances of the electrodes and provided at the inlet or the inlet and outlet port of the battery chamber.

A cooling system is provided around the battery box or within the battery box, to ensure timely dissipation of heat generated by batteries within the battery box during operation, preventing damages to the batteries, battery box or other related devices due to high temperature. The cooling system may be an air cooling channel with an air inlet and an air outlet, an replaceable or cleanable filter is provided on the air inlet, and ventilation sub-channels are provided around the batteries and connected to the external air via the air cooling channel, an air blower may be provided in the air cooling channel to obtain a forcible ventilation, or a dynamic pressure air collecting port using pneumatic pressure from vehicle traveling as the air flow driving force may be provided at the air inlet of the air cooling channel. The cooling system may also be a circulating heat dissipation pipeline, comprising a heat absorption part, a heat dissipation part, a circulating link conduit and a power circulating pump, wherein a cooling medium is filled within the circulating heat dissipation pipeline, the heat absorption part is disposed around the batteries or in contact with the outer walls of the batteries, and the heat dissipation part contacts the external flowing air or the heat dissipation enclosure. The cooling system may also be a gravity heat-pipe comprising an evaporation part, a condensation part, an ascending conduit and a descending conduit, wherein at least one of the evaporation part and the condensation part comprises a plurality of rack conduits in communication with each other. A low boiling point medium is filled within the rack conduits. The evaporation part is in close contact with the batteries, or in contact with the batteries via a good conductor, or provided around the batteries. The condensation part is provided above the evaporation part and in communication with the evaporation part via the ascending conduit and the descending conduit, the condensation part is located in the external flowing air or contacts with the heat dissipation enclosure comprising at least a portion of the enclosure of the electric vehicle body or at least a portion of the enclosure of the battery box body contacting with the external flowing air.

When the rechargeable standard battery units according to the present invention are loaded into the battery box of the present invention, a rechargeable battery pack is formed that is applicable to the method of quickly supplying electric energy to electric vehicles according to the present invention. As the size of the standardized elementary battery unit used is relatively small and may be adapted to a variety of applications, the rechargeable battery pack may be applied to various electric vehicles including electric bicycles, electric cars, electric buses, railed electric buses etc. After that, construction of such electric energy supply stations similar to fuel stations would be widely realized. Then, electric energy to electric vehicles may be conducted quickly according to the method of quickly supplying electric energy to electric vehicles of the present invention, providing a good condition for popularizing electric vehicles. Of course, the existing fuel stations may be updated by adding related equipment to provide battery replacement and power supply services to electric vehicles, meanwhile, the fuel stations may recharge the replaced batteries for cycling use; similarly, urban electric vehicles with pantograph system (wired) may park at designated stations for battery replacement and electric power supply based on the actual consumption of electric energy, thus not requiring the pantograph system. As such, the problem of long charging time of electric vehicles preventing the popularizing of such vehicles in a wide range may be solved.

A slow charge port and a corresponding transforming device may be provided on the battery box for self-charge, such that the electric vehicles may be recharged during idle time such as parking in the garage, using trough power preferentially, or using wind power or photovoltaic power. A quick charge port and a corresponding transforming device may also be provided on the battery box for quickly recharging in case of a charging station without interchangeable batteries in stock.

In the method of quickly supplying electric energy to electric vehicle according to the present invention, electric power is provided through standard battery units comprising standardized small elementary battery units, such standard battery units provided in the battery box of the electric vehicles are quickly loaded and unloaded for quickly supplying electric energy to electric vehicles. After normalization of standard battery units depending on the different models of electric vehicles, the existing fuel stations or vehicle parking spots may be used to provide battery replacement and electric power supply services to electric vehicles, making electric power supply to electric vehicles as convenient as existing gas supply to vehicles. The replaced batteries are recharged at the fuel stations or vehicle parking spots for cycling use. Otherwise power supply stations similar to fuel stations may be widely constructed to achieve this goal. The problem of long charging time of electric vehicles makes drivers reluctant to wait and lead to large occupying space of charging stations thereby hurdling electric vehicles from being popularized; and such problem may be completely solved using the method of quickly supplying electric energy to electric vehicles according to the present invention, while on the other side, the said method may also bring in other environmental benefits including energy saving, emission reduction and noise reduction. The standard battery unit according to the present invention is easy to use and reliable in performance, and particularly applicable to the method of quickly supplying electric energy to electric vehicles according to the present invention. The standard battery unit of the present invention is of small size, light weight, easy to operate, with strong applicability such that it may be used with most of the current available vehicle models, with a larger overall surface area, and easy to dissipate heat; the standard battery unit of the present invention is successfully applied to low-to-medium voltage batteries in electric vehicles, making it safer to use during charging and operation. In addition, the battery box of the present invention is of a simple structure and reliable in operation, enabling convenient battery replacement; it is also provided with a cooling system and safe, applicable to various electric vehicles, thus of great market potential. After equipping the electrical vehicles with the rechargeable battery pack formed by loading the standard battery units of the present invention into the battery box of the present invention, the standard battery units in the battery box may be quickly replaced as desired, making electric power supply more convenient and rapid. To summarize, the method of quickly supplying electric power to electric vehicle and the power supply device thereof according to the present invention may be applied to various electric vehicles including electric bicycles, electric cars, electric buses, railed electric vehicles, wired electric vehicles etc. as well as dual mode electric vehicles or electric watercrafts. It is since of great market potential, and may bring in huge economical benefits as well as social benefits.

BRIEF DESCRIPTION OF THE DRAWINGS

FIG. 1A is the first structural schematic view of a standard battery unit according to the present invention.
FIG. 1B is the left view of FIG. 1A.
FIG. 2A is the second structural schematic view of a standard battery unit according to the present invention.
FIG. 2B is the left view of FIG. 2A.
FIG. 3A is the third structural schematic view of a standard battery unit according to the present invention.
FIG. 3B is the left view of FIG. 3A.
FIG. 4A is the fourth structural schematic view of a standard battery unit according to the present invention.
FIG. 4B is the left view of FIG. 4A.

FIG. 28B is the left view of FIG. 28A.
FIG. 29A is the eighth structural schematic view of the battery box according to the present invention.
FIG. 29B is the top view of FIG. 29A.

DETAILED DESCRIPTION OF THE PREFERRED EMBODIMENTS

First Embodiment

Figure 5A:
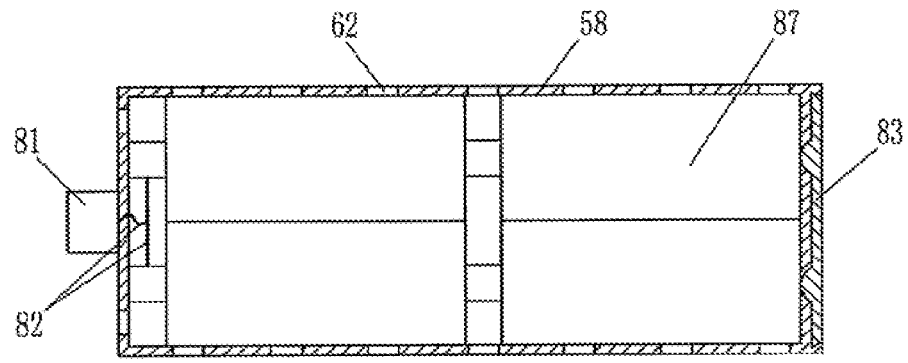
FIG. 5A is the fifth structural schematic view of a standard battery unit according to the present invention.

As shown in FIG. 1A and FIG. 1B, the standard battery unit of the present invention comprises an elementary battery unit 87 with an elastic extension structure 17 provided on the anode, the elastic extension structure 17 being composed of a spring made of a metallic good conductor material. An electrode cap 16 made of a metallic good conductor material is provided on the front end of the spring 17 to prevent foreign matters from falling into the spring 17. The electrode cap may slide relative to the anode while all the time maintaining a good contact with the anode due to the connection by the spring 17. The cathode of the elementary battery unit of the present embodiment is of a typical flat end structure.

The elementary battery unit 87 of the present embodiment may be any of batteries including a lead-acid storage battery, a lead acid gel battery, a metal hydride/nickel battery, a lithium-ion battery, or an iron oxide-lithium battery, and can not be further disassembled as an individual battery.

The extension value of the electrode may be adjusted during operation as of the elastic extension structure provided at the electrode, thereby keeping an effective contact with a connecting port of a related circuit all the time to make the working performance even more consistent and reliable.

The present embodiment is explained in conjunction with the example of the cylindrical elementary battery unit 87, in practical applications, the elementary battery unit in rectangular or any other shapes may be adopted, falling within the scope of the present invention. Unless otherwise stated, this applies to all standard battery units of the present invention, and would not be repeated in the following embodiments.

Second Embodiment

As shown in FIG. 2A and FIG. 2B, the difference between the standard battery unit of the present embodiment and that of the first embodiment is that, electrodes are provided protruding from the respective end face at the two ends of the elementary battery unit 87 respectively, with elastic extension structures 17 and 19 provided on the anode and the cathode respectively, wherein the elastic extension structures 17 and 19 in the present embodiment are made of elastic rubber material. Wherein an electrode cap 16 made of a metallic good conductor material is provided on the elastic extension structure 17 and connected with the anode of the elementary battery unit 87 via a wire 28; an electrode cap 18 made of a metallic good conductor material is provided on the elastic extension structure 19 and connected with the cathode of the elementary battery unit 87 via a wire 29. Attention should be paid to the strength of the connection between the electrode caps and the electrodes, to prevent adverse effects due to accidental falling off of the electrode caps.

The present embodiment is explained in conjunction with an example of the rectangular elementary battery unit 87, and the profile of the cross section of the electrode cap 16 is circular. Likewise, the profile of the cross section of the electrode cap 18 is also circular. No drawings other than descriptions are provided as they belong to simple shapes being adopted in the art. In addition, the size of the electrode cap 16 is larger than that of the electrode cap 18 to distinguish the anode and the cathode.

It needs to be noted that in practical applications, the shapes of the electrode caps may also be provided as other shapes such as square or triangular etc., and the electrode caps 16 and 18 may also be distinguished by other features such as colors, shapes, and sizes etc., wherein the size difference is the easiest to enable automatic identification, thereby preventing from mistaking the directions of electrodes during mounting. In addition, other than metal springs and rubber materials mentioned above, the elastic extension structure may also be made of materials such as elastic polyurethane etc., with a same effect.

Third Embodiment

As shown in FIG. 3A and FIG. 3B, the difference between the standard battery unit of the present embodiment and that of the second embodiment is that, the present embodiment is explained in conjunction with an example of a cylindrical elementary battery unit 87, elastic extension structures 17 and 19 are both made of metal springs, and the profiles of the cross sections of the electrode caps 16 and 18 are square. In addition, in order to prevent damages from excessive wear of the standard batteries in repeated loading and unloading procedures, wear-resistant pad layers 15 are provided on the elementary battery unit 87. In the present embodiment, the wear-resistant pad layers 15 are made of a wear-resistant and heat-resistant engineering plastic.

As of the wear-resistant pad layers 15 included in the standard battery unit of the present embodiment, effective protection to the standard battery unit itself is established, mitigating wear to the enclosure of the standard battery unit during operation, thereby the life span of the product is increased significantly.

It has to be noted that, preferentially, the wear-resistant pad layers are only properly provided locally in certain positions in contact with the external structure during operation of the standard battery unit, in order to facilitate heat dissipation of the standard battery unit. Of course, for the wear-resistant pad layers made of materials with excellent heat dissipation capability, it may not exclude the use of the pad layer all over the surface of the standard battery unit other than at the electrodes. However, from the heat dissipation and cost saving perspectives, it is preferential to provide the pad layer locally. Other than engineering plastics mentioned above, materials such as foam materials or polyurethane etc. may also be used to make the wear-resistant pad layer, at the same time with shock absorption and cushioning functions.

Fourth Embodiment

Other than the anode and the cathode provided on two ends of the elementary battery unit 87 respectively, the present invention may also be applicable to that with the anode and the cathode provided on one and the same end of the elementary battery unit 87. As shown in FIG. 4A and FIG. 4B, the difference between the standard battery unit of the present embodiment and that of the third embodiment is that, the external shape of the elementary battery unit 87 of the present embodiment is rectangular, with the anode and the cathode thereof provided on one and the same end face. In order to distinguish the anode and the cathode, the electrode cap 16 connected with the anode is provided as red, while the electrode cap 18 connected with the cathode is provided as green. It has to be pointed out that the above colors are not shown in the drawings rather than merely being described herein.

In addition, in order to prevent the accidental damages by external impacts, elastic cushion pad layers 80 are provided on the standard battery unit of the present invention. In consideration of heat dissipation, in the present embodiment, the elastic cushion pad layers 80 are also provided locally and made of rubber materials.

As of the elastic cushion pad layers provided, the standard battery unit is much more resistant to accidental damages, thereby beneficial to life span increase of the products. Furthermore, the elastic cushion pad layers are also provided on the surface of the standard battery unit contacting with the external structure, thereby establishing an effective protection to the standard battery unit to prevent excessive wear. As such, the elastic cushion pad layer may also act as the wear-resistant pad layer.

Other than rubber materials, the elastic cushion pad layer may also be made of elastic polyurethane or an elastic foam material etc.

The electrodes may be distinguished by colors, however, in order to enable automatic identification and error correction of battery electrodes, preferentially, the anode cap and the cathode cap are provided with different shapes or sizes.

Fifth Embodiment

Figure 5B:
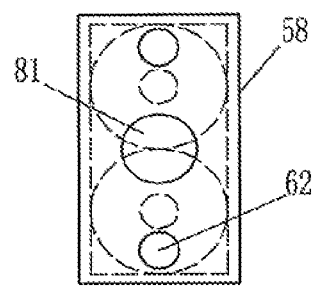
FIG. 5B is the left view of FIG. 5A.

As shown in FIG. 5A and FIG. 5B, the difference between the standard battery unit of the present embodiment and that of the first embodiment is that, the standard battery unit is formed by connecting four cylindrical elementary battery units 87 two by two in series and then connecting the serially-connected elementary battery units in parallel via wires 82, and is disposed into a standard enclosure 58 not to be disassembled during application procedure. Electrodes including an anode 81 connected to the battery pack comprising the elementary battery units 87 via the wires 82 and a cathode 83 made of a good conductor metallic plate are provided on the standard enclosure 58. The application procedure refers to that during normal life span of the standard battery units, the standard enclosure 58 of the present embodiment is made of insulating engineering plastic materials. In order to facilitate heat dissipation, a plurality of through holes 62 in communication with the external environment is provided on the standard enclosure 58. Channels for the elementary battery units to dissipate the heat generated during operation are provided by the gaps between the elementary battery units and the standard enclosure as well as the through holes 62.

In order to ease the explanation of the technical theory of the present embodiment, an example with only four elementary battery units provided in the standard enclosure is provided, however, in practical applications, the number of the elementary battery units may be increased or decreased as desired. In addition, based on the technical theory of the present embodiment, the connecting relationships between the elementary battery units in the standard enclosure may not be limited to the case of connecting the elementary battery units two by two in series followed by connecting the serially-connected elementary battery units in parallel as mentioned, various connections including serial connection, parallel connection, or a combination of serial connection and parallel connection may be provided based on actual needs. The basic theory is that the nominal voltage of the standard battery unit is increased by serial connections between the elementary battery units and the capacity of the standard battery unit is increased by parallel connections between the elementary battery units. In addition, connections may be performed not only by wires, but also by metallic plates and strips etc. made of good conductors, with the same effects.

Sixth Embodiment

Figure 6:
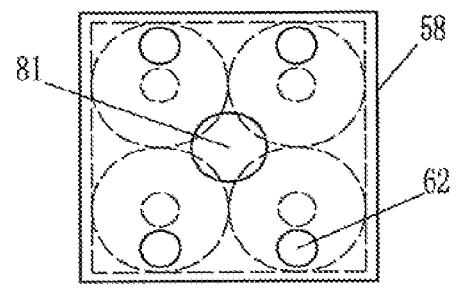
FIG. 6 is the sixth structural schematic view of a standard battery unit according to the present invention.

As shown in FIG. 5A and FIG. 6, the difference between the standard battery unit of the present embodiment and that of the fifth embodiment is that, eight elementary battery units 87 are provided in the standard enclosure 58, the elementary battery units being divided into groups of four elementary battery units and disposed in the standard enclosure 58 by two rows in parallel. The two groups of elementary battery units are finally connected with the anode 81 after being connected in parallel via wires 82. The specific wire connections of the present embodiment belong to conventional techniques in the art, thus would not be described with additional drawings.

Based on the technical theory of the present embodiment and in conjunction with that of the fifth embodiment, the number and the arrangement of the elementary battery units within the standard enclosure of the standard battery unit of the present invention may be provided according to actual needs, without departing the scope of the present invention.

Seventh Embodiment

Figure 7:
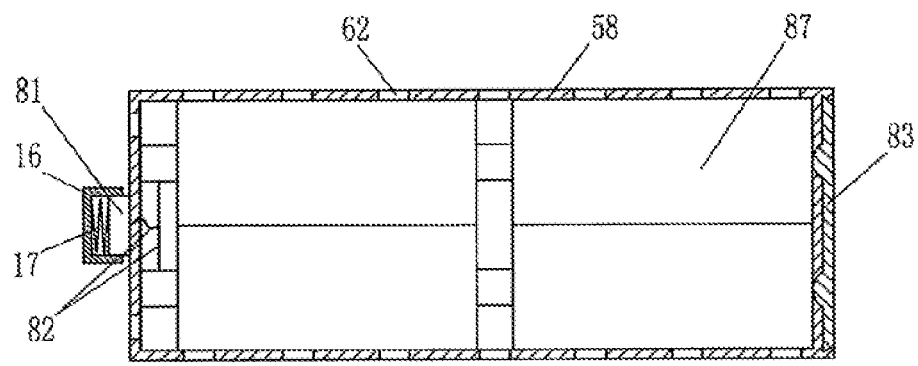
FIG. 7 is the seventh structural schematic view of a standard battery unit according to the present invention.

As shown in FIG. 7, the difference between the standard battery unit of the present embodiment and that of the fifth embodiment is that, an elastic extension structure 17 composed of a spring made of a metallic good conductor material is provided on the anode of the standard battery unit, an electrode cap 16 made of a metallic good conductor material is provided on the front end of the spring in order to prevent foreign matters from falling into the spring.

It has to be additionally pointed out that, as of the good conductivity of the metal spring, the electrode cap 16 and the anode 81 of the standard battery unit are connected by the spring directly, without providing an additional wire.

Of course the elastic extension structure of the electrode of the standard battery unit of the type of the present embodiment may be made of a rubber material or an elastic polyurethane material.

Eighth Embodiment

Figure 8A:
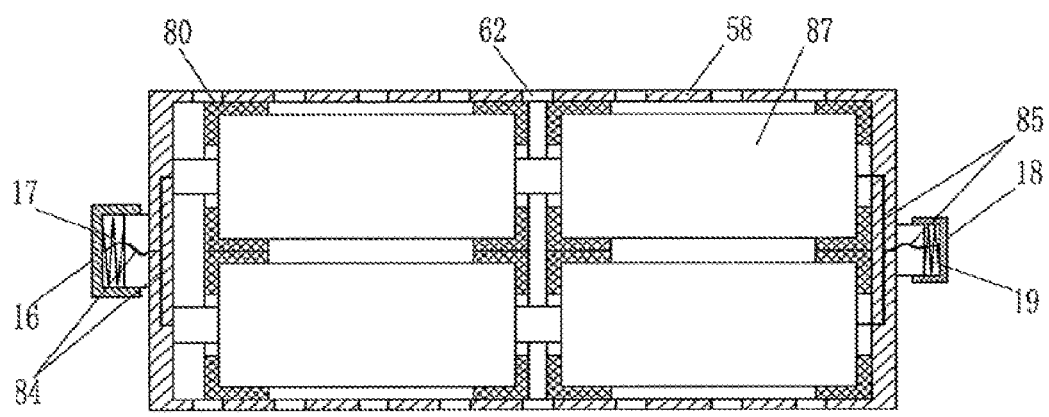
FIG. 8A is the eighth structural schematic view of a standard battery unit according to the present invention.
Figure 8B:
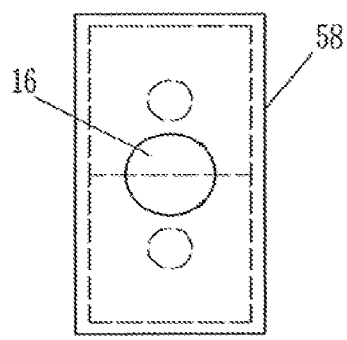
FIG. 8B is the left view of FIG. 8A.

As shown in FIG. 8A and FIG. 8B, the difference between the standard battery unit of the present embodiment and that of the seventh embodiment is that, elementary battery units 87 whose external shape is rectangular are used, with elastic cushion pad layers 80 made of elastic polyurethane material provided thereon. In addition, the electrode cap 16 of the standard battery unit anode is connected to the anodes of the elementary battery unit 87 via wires 84. An electrode protruding from the end face of the standard enclosure 58 is also provided at the cathode of the standard battery unit, an elastic extension structure composed of a metal spring 19 made of a good conductor and an electrode cap 18 being provided on the electrode; and the electrode cap 18 is connected to the cathode of the elementary battery units 87 via wires 85.

The standard battery unit of such structure may be more resistant to external impacts as of the elastic cushion pad layers provided on the internal elementary battery units, and the performance is more consistent and reliable as of the elastic extension structures provided respectively on the anode and the cathode.

Ninth Embodiment

Figure 9A:
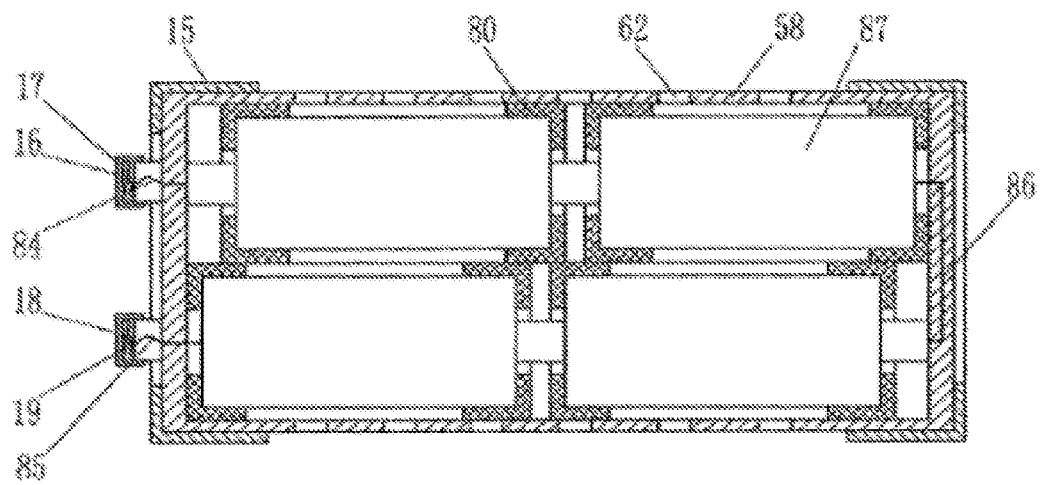
FIG. 9A is the ninth structural schematic view of a standard battery unit according to the present invention.
Figure 9B:
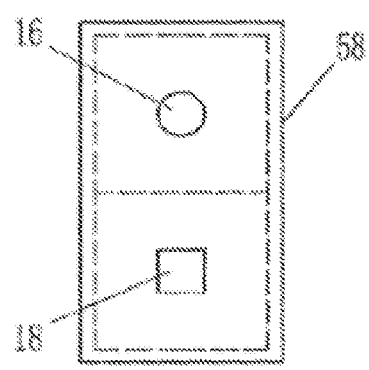
FIG. 9B is the left view of FIG. 9A.

As shown in FIG. 9A and FIG. 9B, the difference between the standard battery unit of the present embodiment and that of the eighth embodiment is that, the anode and the cathode of the standard battery unit are provided on one and the same end of the standard enclosure, through the connections between the electrodes of each other and the connections provided by the wire 86, four elementary battery units 87 in the standard enclosure 58 form a battery pack formed by connecting the four elementary battery units in series, and the anode and the cathode of the battery pack are connected to the anode cap 16 and the cathode cap 18 via the wire 84 and the wire 85 respectively. In addition, wear-resistant pad layers 15 made of engineering plastics are provided on the surface of the standard enclosure 58. In order to distinguish the anode and the cathode of the standard battery unit, the profiles of the cross sections of the anode cap 16 and the cathode cap 18 are provided as circular and square respectively.

Figure 10A:
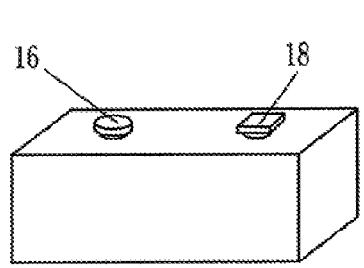
FIG. 10A is the first schematic drawing of the geometry of the standard battery unit according to the present invention of FIG. 9A.
Figure 10B:
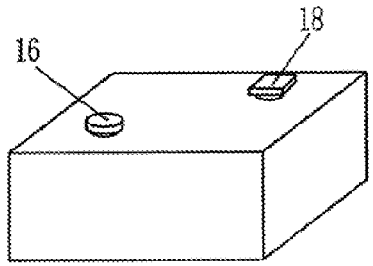
FIG. 10B is the second schematic drawing of the geometry of the standard battery unit according to the present invention of FIG. 9A.

As of the wear-resistant pad layers provided in the standard battery unit of the type of the present embodiment, it is more resistant to wears and of an increased life span. Based on the theory of the present embodiment, the elementary battery units may be of various forms, resulting in various forms of the standard battery units of the present invention. For example, the shapes of the standard battery units of the present invention based on chosen shapes and the arrangements of the elementary battery units may be as shown in FIG. 10A or FIG. 10B, both falling into the scope of the present invention.

Tenth Embodiment

Figure 11A:
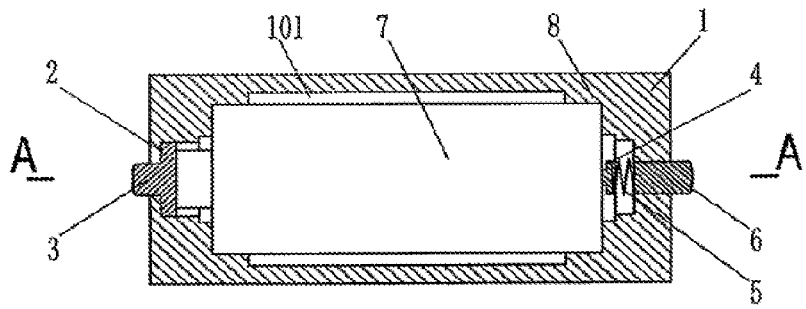
FIG. 11A is the first structural schematic view of a battery box according to the present invention.
Figure 11B:
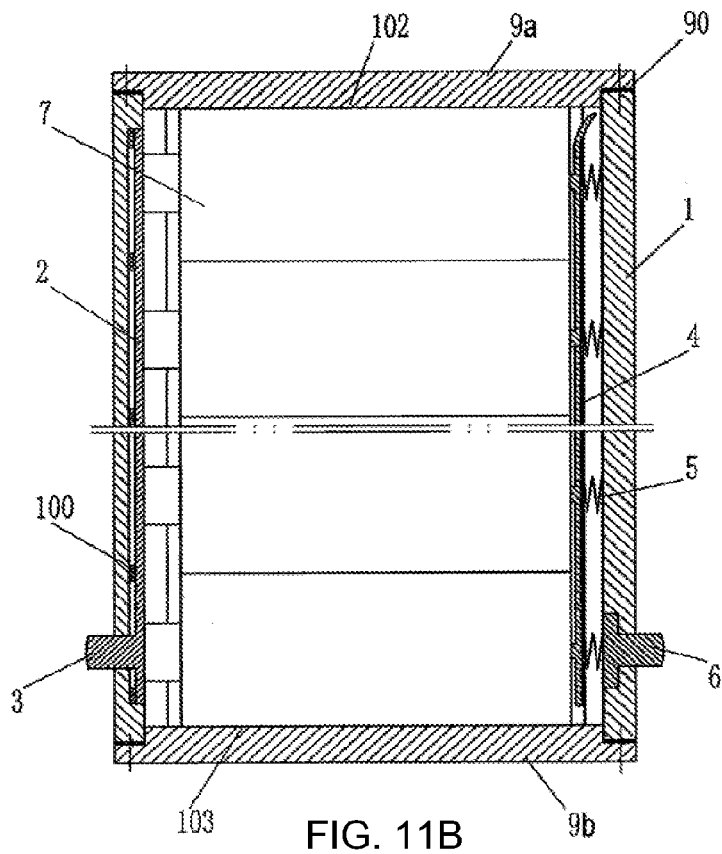
FIG. 11B is a sectional view of FIG. 11A along line A-A.

As shown in FIG. 11A and FIG. 11B, the battery box of the present invention comprises a battery box body 1 made of an insulating engineering plastics inside which a battery chamber 101 capable of accommodating a plurality of standard battery units 7 is arranged. Guiding rails 8 are provided in the battery chamber 101 along the loading direction of the standard battery units 7, with the guiding rails 8 being slide guiding rails which are concave-convex guiding structures integrated in the structure of the battery box body. Additionally, electrode contact rails are provided on the sides of the battery loading direction in the battery chamber, directly contacting with the electrodes of the standard battery units, wherein the electrode contact rails includes an anode contact rail 2 and a cathode contact rail 4. An output port 3 is provided on the anode contact rail 2 for connecting with external circuit; and an output port 6 is connected on the cathode contact rail 4 for connecting with the external circuit. By connecting the output ports 3 and 6 and the circuits of the external power device, power supply for the operation of the electric vehicles is obtained. The anode contact rail 2 is made of a good conductor material (copper bar in the present embodiment) with good flexural resilience in the direction of contacting with the electrode of the standard battery units, and connected to the battery box body 1 through heat-resistant rubber pads 100 softer than copper; the cathode contact rail 4 is made of a relatively rigid good conductor material (still copper bar in the present embodiment). And elastic elements 5 (metal helical springs in the present embodiment) are provided between the cathode contact rail 4 and the battery box body 1 to ensure effective contact with the standard battery units. An inlet and an outlet are provided at two ends of the battery chamber 101 respectively, with protection covers 9a and 9b provided at the inlet and the outlet respectively. In order to prevent water, foreign matters or dusts from entering into the battery chamber causing unintended shorts or openings of the circuits, sealing elements 90 (rubber sealing pads in the present embodiment) are provided on the battery box body 1. In addition, in order to facilitate easy loading of the standard battery units, as shown in FIG. 11B the cathode contact rail 4 is provided as partially curved at the inlet, in a bell-mouthed shape. Battery locating means are provided in the battery box, such battery locating means of the present embodiment are protrusions provided on the protection covers 9a and 9b, i.e., stops 102 and 103 protruding into the battery chamber. During loading of the batteries, the protection cover 9b and the limit stop 103 at the battery outlet are firstly disposed in position, then a predetermined number of batteries are loaded into the battery chamber, and the protection cover 9a is connected with the battery box body through fasteners (not shown) into one piece. At this point, the stop 102 effectively limits the position of the batteries in the battery chambers. In the present embodiment, the electrodes are connected in parallel, therefore the batteries are in parallel connection after the standard battery units are disposed in position with the battery electrodes contacting the electrode contact rails, the nominal voltage and the capacity of the battery pack is since achieved by the resultant battery pack.

Figure 12A:
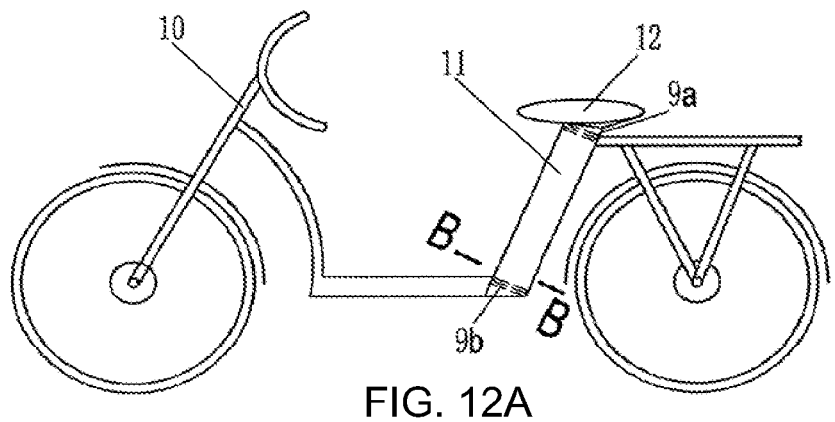
FIG. 12A is the schematic view of the application of the battery box according to the present invention of FIG. 11B.
Figure 12B:
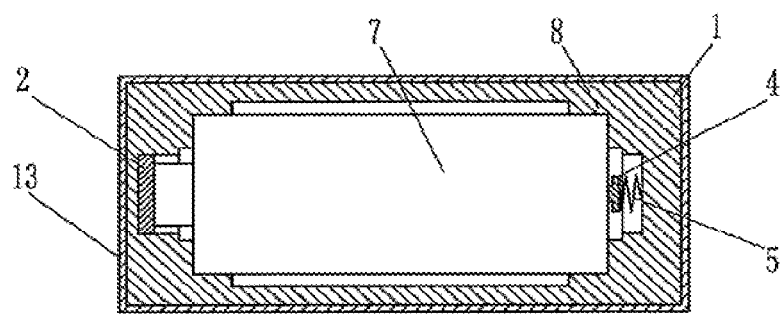
FIG. 12B is a sectional view of FIG. 12A along line B-B.

The following description is based on the application of existing elementary battery units as standard battery units 7 to the battery box of the present invention. In the present embodiment, the standard battery units 7 provided in the battery box are cylindrical lithium batteries. When applied to electric bicycles, as shown in FIGS. 12A and 12B, the rechargeable battery pack formed by the battery box and the standard battery units 7 of the present embodiment together is provided in advance in the support 11 made of a light weight metallic section 13 of the electric bicycle 10, wherein the standard battery units 7 are provided in the battery chamber of the battery box, and the inlet is provided under the seat 12. The protection cover 9a is provided integrally with the seat 12. The protection cover 9a is opened by lifting the seat 12 after loosening the fasteners between the battery box body and the protection cover. The electric bicycle 10 in need of electric power supply is driven into the power exchange station, with the drained standard battery units in the battery box being replaced with fully-charged standard battery units upon payment, the specific process comprises the following steps:

1) the electric bicycle is driven into the power exchange dock of the power exchange station; the driver orders standard battery units to be replaced according to model and number of the standard battery units needed. The protection covers 9a and 9b are opened, and the battery box is switched to a replacement state, at the same time releasing the positional locking of the standard battery units 7 within the battery box;

2) the loading port of the battery replacement device (not shown) is docked with the inlet of the battery box of the electric vehicle, and the battery replacement device is started to load the fully-charged standard battery units through the inlet of the battery box one by one according to the model and number of the standard battery units ordered, meanwhile the drained standard battery units in the battery chamber of the battery box are unloaded through the outlet of the battery box one by one and collected by a dedicated container;

3) the model, number and price of the standard battery units being loaded are displayed on the battery replacement device synchronously;

4) after replacement of the drained standard battery units within the battery box, the battery replacement device is moved away, the protection covers 9a and 9b are fixed again, and the standard battery units of the battery pack are locked, the electric power supply to the electric vehicle is since completed;

5) the standard battery units are in proper contact with the electrode contact rails after entering into the battery box and being locked in position, and achieve a battery pack nominal voltage and battery pack capacity as needed through the combinations of the electrode contact rails;

6) during the above period the driver pays for the batteries according to the ordered number of the batteries to be replaced or the driver pays according to the actual number of the replaced batteries displayed;

7) the drained standard battery units replaced are transferred to charging room for recharging, and the fully-charged standard battery units are transferred to the battery storeroom for further use.

As the nominal working voltages of the electric bicycles are relatively low, the number of the standard battery units used is relatively small, and the weights are relatively light, thus manual replacement of batteries may be possible. The fully-charged standard battery units may be loaded through the inlet of the battery box one by one just like loading magazines, and at the same time, the drained standard battery units in the battery box may be unloaded through the outlet; or it is also possible to unload all the batteries at first and then load new ones, which is also convenient and quick.

Eleventh Embodiment

Figure 13:
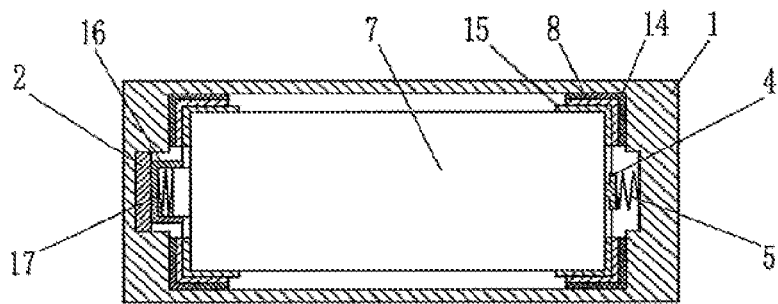
FIG. 13 is the second structural schematic view of the battery box according to the present invention.

As shown in FIG. 13, the difference between the battery box of the present embodiment and that of the tenth embodiment is that, the guiding rails 8 are guiding strips fixedly provided within the battery chamber, elastic cushion vibration-absorption pad layers 14 made of elastic polyurethane material are provided between the guiding rails 8 and the battery box body to prevent bad contact or accident damages to the standard battery units due to bumping during operation of the electric vehicles. In addition, in order to prevent damages due to excessive wears caused by excessive contacts of the batteries 7 (that is, the standard battery units) with the guiding rails 8 during repeated loading and unloading procedures for charging, wear-resistant pad layers 15 are provided on the standard battery units at the positions corresponding to the guiding rails 8, such wear-resistant pad layers are made of the material of tetrafluoroethylene. Furthermore, an elastic extension structure is provided on the electrode of the standard battery unit 7, such elastic extension structure is composed of a spring 17 in the present embodiment. In order to prevent foreign matters from falling into the spring and thus causing stuck, an electrode cap 16 made of a metallic good conductor material is additionally provided on the top end of the spring. The elastic extension structure provided on the battery electrode may ensure effective contact between the electrode and the anode contact rail, and an elastic element is also provided between the cathode contact rail and the battery box body, such that the battery box of this structure may ensure good contacts between the electrodes and the electrode contact rails, and make the performance more reliable.

The life span of the standard battery unit of the present embodiment is also increased as of the wear-resistant pad layers 15 provided. As of the elastic cushion vibration-absorption pad layers 14 provided between the guiding rails and the battery box body, the vibration resistance of the battery box is since increased significantly with a more consistent and reliable performance, the life span of such battery box is also increased.

Twelfth Embodiment

Figure 14:
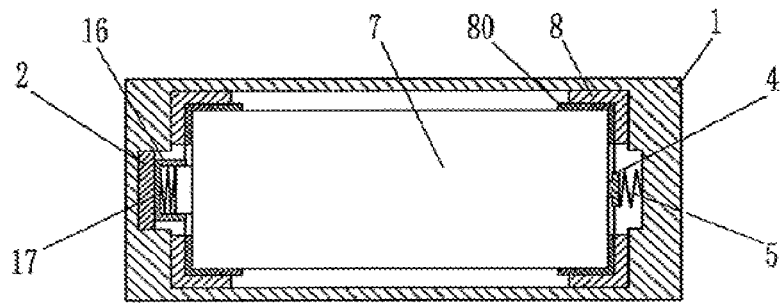
FIG. 14 is the third structural schematic view of the battery box according to the present invention.

As shown in FIG. 14, the difference from the eleventh embodiment is that, elastic cushion pad layers 80 made of an elastic rubber material are directly provided on the standard battery units 7, as such, there is no need to provide an additional elastic cushion vibration-absorption pad layer between the guiding rails 8 and the battery box body 1, and the guiding rails 8 and the battery box body 1 may be fixed together directly.

By using the standard battery of such structure according to the present invention, the space within the battery chamber may be saved, making the overall size of the battery box more compact, thus increasing the space utilization of the electric vehicles. It has to be noted that, the elastic cushion pad layers 80 may also prevent excessive wear between the standard battery units 7 and the guiding rails, therefore the elastic cushion pad layers 80 may also act as wear-resistant pad layers.

Thirteenth Embodiment

Figure 15A:
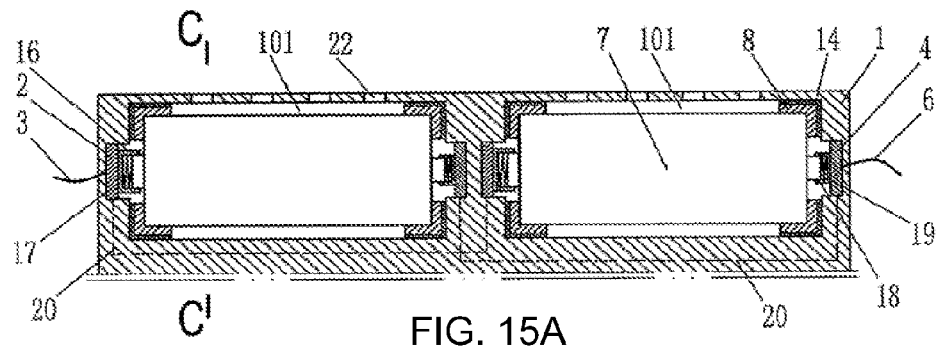
FIG. 15A is the fourth structural schematic view of the battery box according to the present invention.
Figure 15B:
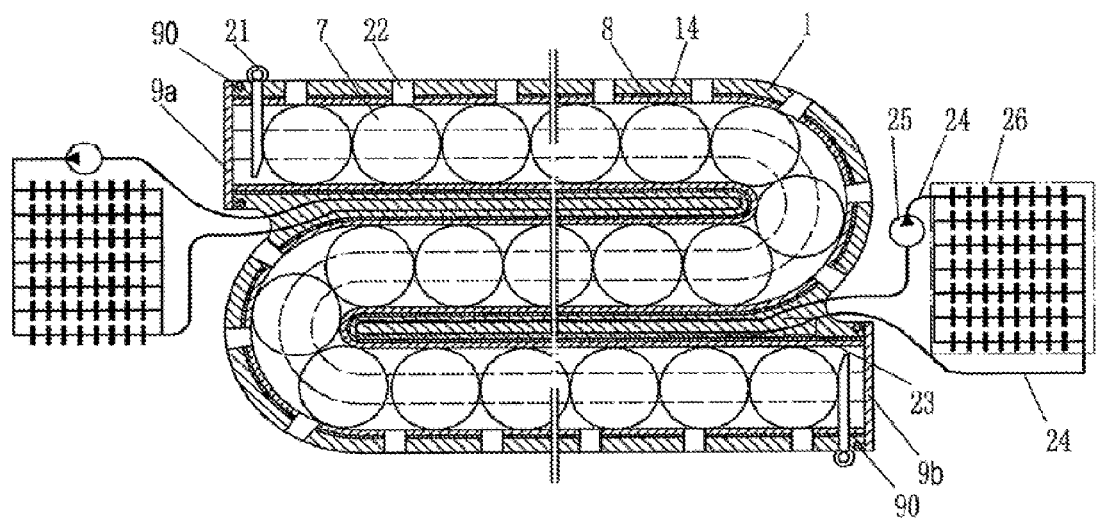
FIG. 15B is a sectional view of FIG. 15A along line C-C.
Figure 16:
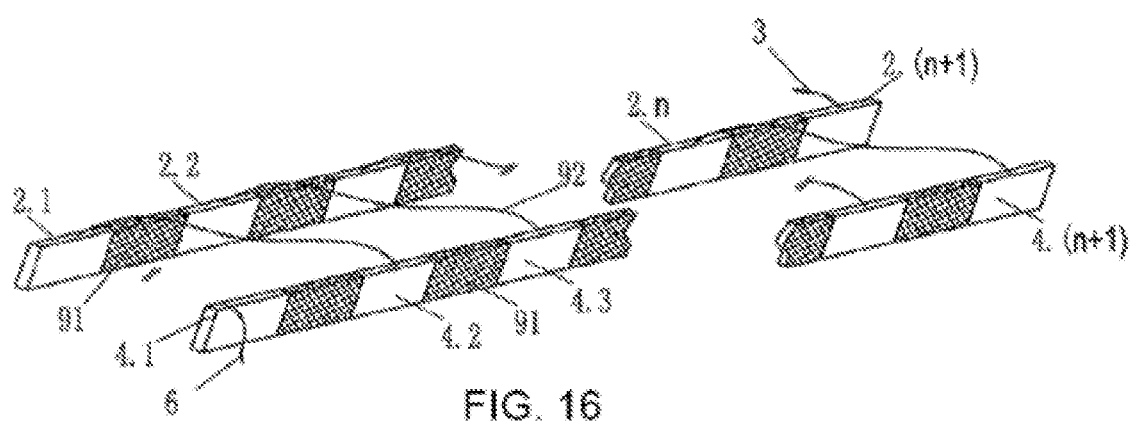
FIG. 16 is the view illustrating the principle of the connection of the electrode contact rails within the battery box of FIG. 15A.

As shown in FIG. 15A, FIG. 15B, and FIG. 16, the difference between the battery box and the standard battery units of the present embodiment and those of the eleventh embodiment is that, two non-linear battery chambers 101 are provided in the battery box, and the sub-packs of batteries formed by the standard battery units in the two battery chambers are connected in parallel via wires 20. The parallel wire connections belong to conventional techniques in the art which are very simple, there is since no specific illustration of how the two wires 20 connect the two battery chambers in parallel. The guiding rails 8 are made of insulating bakelite which has smooth surface, elastic cushion vibration-absorption pad layers 14 made of rubber material are arranged under the guiding rails, alleviating wears to the standard battery units 7. Therefore, wear-resistant pad layers are no longer provided on the standard battery units 7. This structure can overcome the adverse affects brought to the heat dissipation of the batteries due to the arrangement of wear-resistant pad layers on the batteries. In order to facilitate the heat dissipation of the batteries in the battery box, a plurality of through-holes 22 in communication with the external environment is provided on the battery box body. In addition, an elastic extension structure including a spring 19 is also provided on the electrode of the standard battery unit 7 corresponding to the cathode contact rail 4, with an electrode cap 18 made of a metallic good conductor material provided at the top end of the spring 19. The positive and the negative electrodes of the standard battery units 7 are provided on the two ends of the standard battery units respectively, with the electrodes protruding from the respective end faces of the standard battery units. In order to distinguish the positive and the negative electrodes of the batteries to prevent mis-use, the electrode caps 18 and 16 have different shapes in addition to different sizes, in the present embodiment, the electrode cap 16 is cylindrical while the electrode 18 is cubic. The anode contact rail 2 and the cathode contact rail 4 are connected to the output ports 3 and 6 (wires in the present embodiment) respectively for connecting to the external circuits. A cooling system is also provided in the battery box, to ensure timely heat dissipation of heat generated by batteries within the battery box during operation. Said cooling system is a circulating heat dissipation pipeline comprising a heat absorption part 23, a heat dissipation part 26, a circulating link conduit 24 and a power circulating pump 25, wherein a cooling medium is filled within the circulating heat dissipation pipeline, the power circulating pump 25 drives the circulation of the cooling medium, and the heat absorption part 23 is disposed around the batteries 7 within the battery box body. The cooling medium takes away heat in the battery box while being driven to the heat absorption part so as to cool the batteries, the heat dissipation part 26 is in contact with external flowing air, and the cooling medium after absorbing the heat dissipates the heat to the air while being driven to the heat dissipation part. The cooled cooling medium is returned to the heat absorption part via the circulating link conduit to start a next cycle. Protection covers 9a and 9b connected to the battery box body through bayonet means are provided at the inlet and the outlet of the battery chamber 101 respectively. In order to prevent foreign matters from entering, sealing structures 90 are provided between the protection covers and the battery body box. The sealing structures are bayonet features made of rubber-plastic materials provided on the protection covers in the present embodiment, after bayonet coupling with the bayonet features of the battery box body, self-sealing is established. Battery locating devices (mobile stops 21 capable of being inserted into or retracted from the battery chamber in the present embodiment) are provided at the inlet and the outlet repetitively. It has to be noted that, the standard battery units used in the battery box of the present invention are low-to-medium voltage batteries, thus the standard battery units 7 in each of the battery chambers 101 are provided in serial connection, to increase the nominal voltage of the system properly. To achieve this goal, as shown in FIG. 16, the electrode contact rails of the present embodiment are provided in small local segments. Insulating material segments 91 are connected between the small segments of the anode contact rail into one piece for smooth loading of the standard battery units; similarly, insulating material segments 91 connect the small segments of the cathode contact rail into one piece, while small segments of the anode contact rail and small segments of the cathode contact rail are sequentially connected via wires. As shown, small segment 2.1 of the anode contact rail and small segment 4.2 of the cathode contact rail, small segment 2.2 of the anode contact rail and small segment 4.3 of the cathode contact rail . . . and until small segment 2.$n$ of the anode contact rail and small segment 4.$(n+1)$ of the cathode contact rail are connected via wires 92 respectively, and an output port 3 and an output port 6 are provided on small segment 2.$(n+1)$ of the anode contact rail and small segment 4.1 of the cathode contact rail at the ends of the electrode contact rails respectively. After loading standard battery units in this way, the adjacent standard battery units are since connected in series, forming a serially connected powering battery pack.

Figure 17:
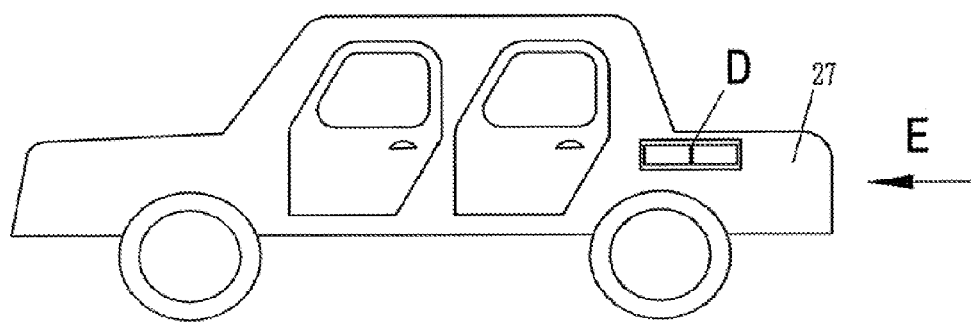
FIG. 17 is the schematic view of the application of the battery box according to the present invention of FIG. 15A.
Figure 18:
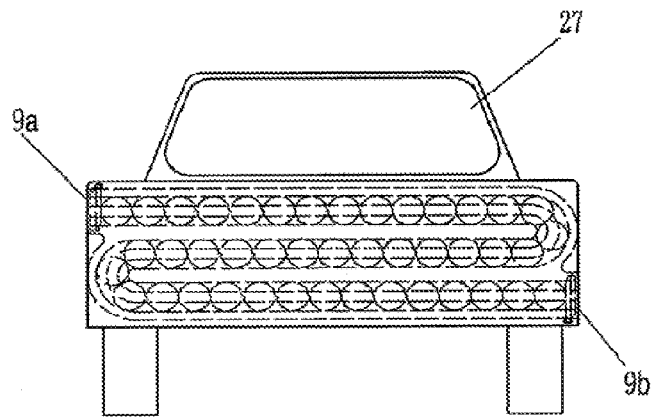
FIG. 18 is the schematic drawing of FIG. 17 along E direction.

When applied to electric cars, as shown in FIG. 17 and FIG. 18, the rechargeable battery pack formed by assembling the battery box and the standard battery units of the present embodiment together is disposed in advance at the position D of the electric car 27, powering the car via the connection between the output ports 3 and 6 and the circuits of the driving device of the car. The electric car in need of electric power supply is driven into the power exchange station to replace the drained standard battery units in the battery box with fully-charged standard battery units upon payment, the process comprises the following steps:

1) the electric car is driven into the power exchange dock of the power exchange station; the driver orders standard battery units to be replaced according to model and number of the standard battery units needed. The protection covers 9$a$ and 9$b$ are opened, and the battery box is switched to a replacement state, at the same time releasing the positional locking of the standard battery units 7 within the battery box by extracting the mobile stop 21;

2) the loading port of the battery replacement device (not shown) is docked with the inlet of the battery box of the electric vehicle, and the battery replacement device is started to load the fully-charged standard battery units through the inlet of the battery box one by one according to the model and number of the standard battery units ordered, meanwhile, the drained standard battery units in the battery chamber of the battery box are unloaded through the outlet of the battery box one by one and collected by a dedicated container;

3) the model, number and price of the standard battery units being loaded are displayed on the battery replacement device synchronously;

4) after replacement of the drained standard battery units within the battery box, the battery replacement device is moved away, the protection covers 9$a$ and 9$b$ are fixed again, the mobile stop 21 is inserted, and the standard battery units of the battery pack are locked, the electric power supply to the electric vehicle is since completed;

5) the standard battery units are in proper contact with the electrode contact rails after entering into the battery box and being locked in position, and achieve a battery pack nominal voltage and a battery pack capacity as needed through the combinations of the electrode contact rails;

6) during the above period the driver pays for the batteries according to the ordered number of the batteries to be replaced or the driver pays according to the actual number of the replaced batteries displayed;

7) the drained standard battery units being replaced are transferred to charging room for recharging, and the fully-charged standard battery units are transferred to the battery storeroom for further use.

It has to be pointed out that, the present embodiment is explained in conjunction with an example of two sets of circulating heat dissipation pipelines, in practical applications, only one set may be provided based on actual needs. In addition, other arrangements may be used for the construction of the pipelines, yet with same heat dissipation effect for the batteries. In addition to being arranged around the batteries, the cooling system may be disposed within the battery chamber, in direct contact with the outer walls of the batteries, thereby increasing the efficiency of heat dissipation. In addition to being in contact with external flowing air as mentioned in the present embodiment, the heat dissipation part may also be in contact with the heat dissipation enclosure of the electric vehicle, and the said enclosure may be a part of the vehicle body enclosure or a part of the battery box enclosure for heat dissipation.

According to the technical principle of the present embodiment, based on actual needs, the size of the individual battery chamber and the number of the standard battery units accommodated therein may be adjusted, the serial or parallel connections between the battery chambers may be adjusted, or the number of the battery chambers may be adjusted, in order to reach the working voltage and the capacity needed. For example, based on the connections of the present embodiment, in case of a standard battery unit (ion oxide-lithium battery in the present embodiment) with a voltage of 3.3V and a capacity of 60 A·h, and when n+1=100, the total voltage of the battery box is the total series voltage of each chamber, i.e., 330V, and the total capacity is the sum of the capacities of the two chambers, i.e., 120 A·h. In case of 50 standard battery units being provided in each of the battery chambers, four battery chambers may be provided, with each two of the battery chambers being connected in series, and the serially connected battery chambers being connected in parallel, a total voltage of 330 V and a total capacity of 120 A·h may also be achieved. According to this principle, for same total voltage and total capacity, the shapes, sizes, numbers and arrangements of the battery chambers as well as the battery box may be optimized according to the available space in the electric vehicles and the sizes of the standard battery units, which greatly facilitates the optimized design of the electric vehicles.

Fourteenth Embodiment

Figure 19A:
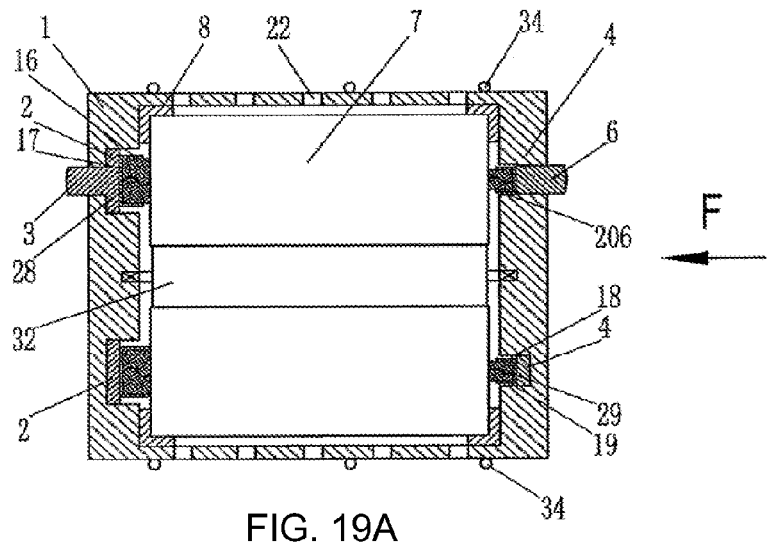
FIG. 19A is the fifth structural schematic view of the battery box according to the present invention.
Figure 19B:
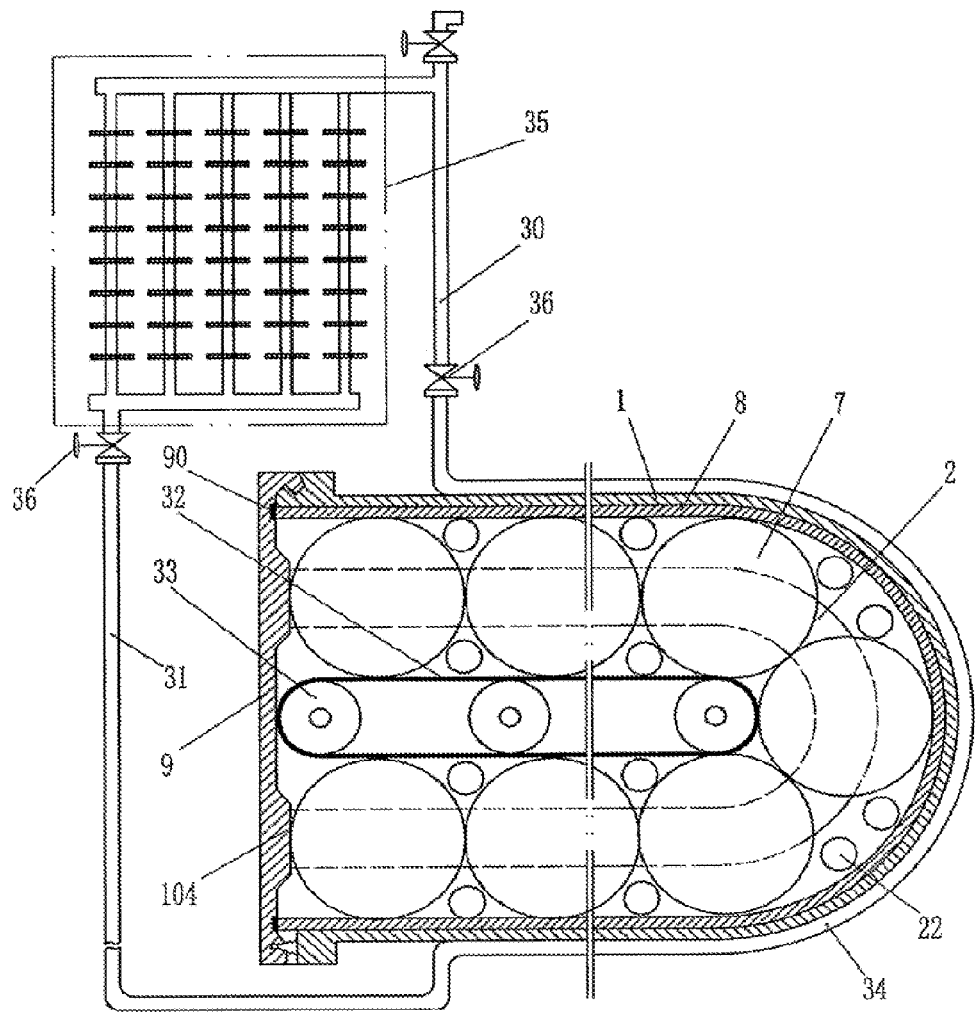
FIG. 19B is the schematic drawing of FIG. 19A along F direction.

As shown in FIG. 19A and FIG. 19B, the difference between the battery box and the standard battery units 7 of the present embodiment and that of the thirteenth embodiment is that, the battery chamber is provided in U-shape, with guiding rails made of bakelite still provided on the outer sides of the battery chamber. In addition, a rolling guiding rail comprising rotatable rollers 33 and a guiding conveyer belt 32 is provided in the middle of the battery chamber. The anode and the cathode of the standard battery unit 7 are provided with elastic extension structures 17 and 19 made of elastic polyurethane material respectively. Wires 28 and 29 provided in the elastic extension structures 17 and 19 connect the anode and the cathode to the electrode caps 16 and 18 respectively. Output ports 3 and 6 for connecting with the external circuits are provided on the anode contact rail 2 and the cathode contact rail 4 respectively, wherein the output ports 3 and 6 are both standard plug-ins. A protection cover 9 is provided at the inlet and the outlet of the battery chamber, with one end being hinged to the battery box body 1, and the other end being securely connected to the battery box body via bayonet means. A sealing element 90 is additionally provided on the protection cover. When the protection cover is fastened, sealing to the battery chamber is obtained. In the present embodiment, the sealing element is a sealing strip of elastic polyurethane. The protrusion provided on the protection cover acts as the mobile stop 104 that may protrude into or be retracted from the battery chamber. When the protection cover 9 is fastened, the mobile stop would automatically place the batteries in position. In addition, in order to prevent damages due to the reverse of the anode and the cathode during loading of the standard battery units 7, an automatic identification error-proof device 206 for the electrodes is fixedly arranged in the battery chamber, in the present embodiment, such automatic identification error-proof device is a pin cooperating with a groove provided on the enclosure of the standard battery unit 7.

Through holes 22 for heat dissipation are provided on the battery box body. In addition, a cooling pipeline for heat dissipation is provided on the surface of the battery box body 1 surrounding the batteries. In the present embodiment, such cooling system is a gravity type heat pipe comprising an evaporation part, a condensation part 35, an ascending conduit 30 and a descending conduit 31, wherein the evaporation part comprises a plurality of rack conduits 34 of the evaporation part in communication with each other surrounding the surface of the battery box body around the batteries, an low boiling point medium is filled in the rack conduits 34. The condensation part 35 is positioned above the evaporation part and similarly comprises a plurality of rack conduits in communication with each other. The condensation part is connected to the evaporation part via the ascending conduit 30 and the descending conduit 31, while the condensation part 35 is located in the external flowing air. To facilitate maintenance, control valves 36 are provided in the ascending conduit 30 and the descending conduit 31 respectively. An opening for adding the low boiling point medium is provided at the top-most point of the ascending conduit and the control valve is provided at the opening. After the evaporation part absorbs the heat dissipated due to the operation of the batteries, the low boiling point medium in the rack conduits 34 of the evaporation part is heated and converted into its gas state, and subsequently flows into the condensation part 35 through the ascending conduit 30. After the heat is dissipated to the external air by the condensation part, the low boiling point medium is converted back to the liquid state, and flows back to the evaporation part through the descending conduit 31 to start a next thermal cycle. After the process of repeated thermal cycles, the heat due to the operation of the batteries within the battery box may be dissipated in time, thus avoiding damages to the batteries, the battery box and other devices due to high temperature. The entire process of heat dissipation does not consume additional energy, thus being eco-friendly and economical. As of the high heat conductivity of the heat pipes, the batteries are at relatively low temperatures during operation, and the life span of such batteries is thus increased.

It has to be noted that the standard battery units in the battery chamber of the present invention are still connected in series, with the principle of the serial wire connections similar to that explained in the thirteenth embodiment, thus no further details are provided with further drawings.

Figure 20:
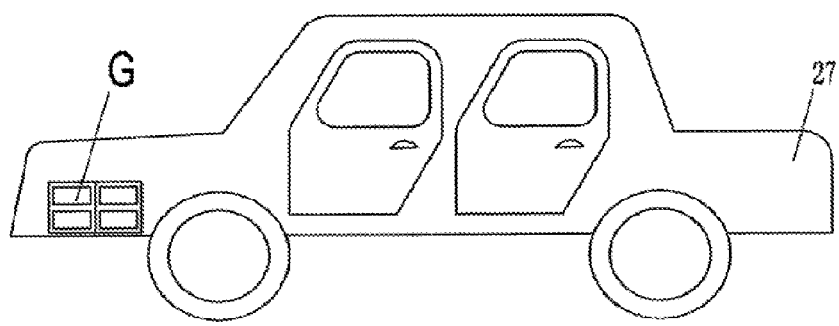
FIG. 20 is the schematic view of the application of the battery box according to the present invention of FIG. 19A.

When applied to electric cars, as shown in FIG. 20, the rechargeable battery pack formed by assembling the battery box and the standard battery units of the present embodiment together is disposed on the electric car 27 at the position G along the direction as shown, powering the car via the connections between the output ports 3 and 6 and the circuits of the driving device of the car. In order to increase the capacity of the battery box, two sets of the above mentioned battery box and the standard battery units may be provided on the electric car to form a rechargeable battery pack, wherein these two sets are connected in parallel. In case of 92 standard battery units (for example lithium-ion batteries) each with a voltage of 3.6V and a capacity of 60 A·h provided in each battery chamber, the total voltage of the standard battery units in serial connection in the battery box is 331V, and the total capacity of the battery boxes with the two battery chambers in parallel connection is 120 A·h, resulting in a total storage energy value of 39.7 kWh of the whole battery pack. That is, the electric vehicle may continuously run about 265 km with one charge based on an estimated average electricity consumption of 15 kWh per 100 km of the current electric vehicles.

The electric car 27 in need of electric power supply is driven into a power exchange station to replace the drained standard battery units in the battery box with fully charged standard battery units upon payment. The electric power supply process differs from that of the thirteenth embodiment only in the releasing and restoring the operation of the positional locking of the standard battery units 7 within the battery box.

In addition to the technical solution according to the present embodiment, the evaporation part may also be in close contact with the outer walls of the batteries directly or through a good conductor material, resulting in excellent effect of heat dissipation. In addition, the condensation part may be in contact with the heat dissipation enclosure of the electric vehicles other than being located in the external flowing air. It has to be noted that the position of the condensation part should be higher than the evaporation part during operation as of the fact that the gravity type heat pipe used in the cooling system uses the gravity of the low boiling point medium as the driving force of the circulation.

Fifteenth Embodiment

Figure 21:
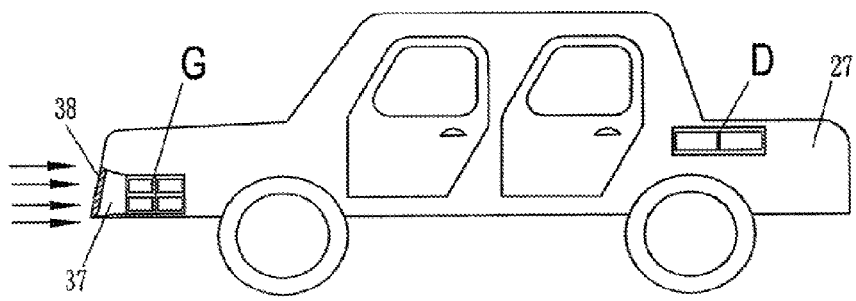
FIG. 21 is the schematic view of the application of the battery boxes according to the present invention of FIG. 15A and FIG. 19A.
Figure 22A:
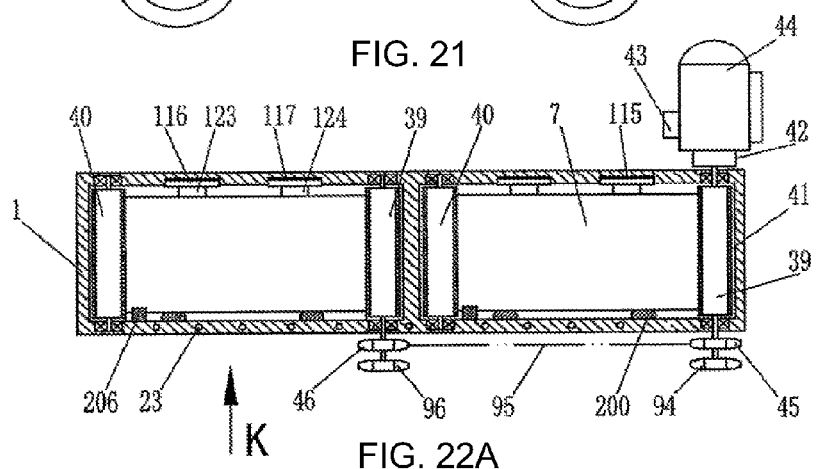
FIG. 22A is the sixth structural schematic view of the battery box according to the present invention.
Figure 22B:
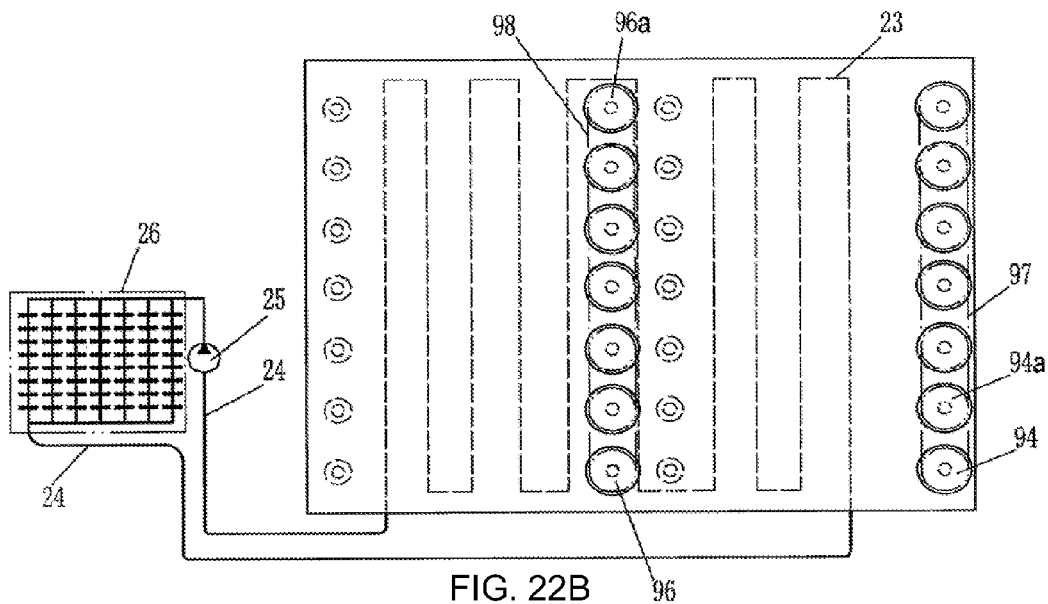
FIG. 22B is the schematic drawing of FIG. 22A along K direction.

As shown in FIG. 21, the difference between the present embodiment and the thirteenth embodiment as well as the fourteenth embodiment is that, more than one rechargeable battery packs may be provided at different positions of the electric car 27. A rechargeable battery pack comprising the battery box and the standard battery units of the present invention as shown in FIGS. 15A and 15B is disposed at the position D of the electric car, and a rechargeable battery pack comprising the battery box and the standard battery units of the present invention as shown in FIGS. 19A and 19B is disposed at the position G of the electric car in the present embodiment. In addition, for the rechargeable battery packs provided at the position G, in addition to the cooling system comprising the gravity type heat pipes for heat dissipation of the batteries, the cooling system also comprises an air cooling channel 37 at front of the electric car with an air inlet and an air outlet. A replaceable or cleanable filter 38 is provided at the air inlet, and ventilation sub-channels comprising through holes 22 provided on the battery box body and gaps between the batteries are provided around the batteries and communicate with the external fresh air via the air cooling channel. A dynamic pressure air collecting port using pneumatic pressure from vehicle traveling as the air flow driving force is provided at the air inlet of the air cooling channel. As such, during traveling of the electric vehicle, the external fresh air may directly reach the batteries though the air cooling channel and the ventilation sub-channels, heat generated by the batteries is naturally taken away during circulation of the air flows, thereby cooling the batteries. Of course, an air blower may be provided within the air cooling channel to obtain forcible ventilation.

The present embodiment is explained in conjunction with two rechargeable battery packs provided on the electric car. In practical applications, more rechargeable battery packs may be provided based on the space of the vehicle body and actual needs. Furthermore, the rechargeable battery packs may be identical or not.

Sixteenth Embodiment

As shown in FIG. 22A, FIG. 22B, FIG. 23 and FIG. 24, the difference between the battery box of the present embodiment and that of the tenth embodiment is that, it comprises two battery chambers, with a single common inlet and outlet port for unloading or loading batteries provided in each of the battery chambers. A mobile stop 21 that may protrude into or retract from the battery chamber is provided at the respective inlet and outlet port of each of the battery chambers, with one end of the mobile stop 21 being hinged to the battery box body 1 and the other end being fixedly connected to the battery box via a locking means 48. In addition, one protection cover 9 is shared by two battery chambers, with one end of the protection cover 9 being hinged to the battery box body 1, and the other end being fixedly connected to the battery box body via fasteners (not shown). A sealing strip 90 is provided between the protection cover and the battery box body. In addition, a rolling guiding rail comprising rollers is provided in each of the battery chambers, wherein two rollers at the inlet and outlet port end act as driving rollers 39, and are directly driven by a motor 44 through a sprocket 45 and a sprocket 46 as well as a chain 95, while the remaining rollers are all driven rollers 40. In addition, the driven rollers 40 on the same side as the two driving rollers 39 are synced with the driving rollers by a drive chain comprising a sprocket 94, a sprocket 94a and a chain 97 and a drive chain comprising a sprocket 96, a sprocket 96a and a chain 97, respectively. A driving mechanism for battery loading and unloading comprises a driving motor 44, a control system 43, a deceleration device 42 and a transmission device. In the present embodiment, the transmission device comprises the sprocket 45, the sprocket 46, the sprocket 94, the sprocket 96, the sprocket 94a, the sprocket 96a, the chain 95, the chain 97 and the chain 98 provided on the driving rollers and driven rollers. The driving rollers and the driven rotation rollers provided on the same side as the driving rollers are driven in rotation by the motor. The standard battery units 7 causes rotation of the driven rollers on the other side during loading process, such that the standard battery units 7 are loaded successfully into the battery chambers. A cooling system is also provided in the battery box in the present embodiment. The cooling system is a circulating heat dissipation pipeline comprising a heat absorption part 23, a heat dissipation part 26, a circulating link conduit 24 and a power circulating pump 25, wherein a cooling medium is filled within the circulating heat dissipation pipeline, the power circulating pump 25 drives the circulation of the cooling medium, and pipelines of the heat absorption part 23 are disposed in the battery box body below the batteries 7. The cooling medium takes away heat in the battery box while being driven to the heat absorption part, to cool the batteries; and the heat dissipation part 26 is in contact with external flowing air, and the cooling medium after absorbing the heat dissipates the heat to the air while being transferred to the heat dissipation part. The cooled cooling medium is returned to the heat absorption part via the circulating link conduit to start a next cycle. Furthermore, protection layers 41 made of elastic rubbers are provided on the surfaces of all the rollers comprising the driving rollers 39 and the driven rollers 40, in order to prevent damages to the batteries due to compressions during the contact between the rollers and the batteries. The protection layers may also act to cushion and absorb vibrations. In order to decrease the friction during loading and unloading of the standard battery units, continuous slide guiding rails 200 made of tetrafluoroethylene sheets are fixedly provided in the battery chambers. In addition, in order to prevent accidents due to the reverse of the anode and the cathode during loading of the standard battery units 7, automatic identification error-proof devices 206 for the electrodes are fixedly provided in the battery chambers, in the present embodiment, such device are different sized chamber features designed for the different sized electrodes. As the chamber size for the cathode is slightly larger than the size of the cathode cap 18 while smaller than the size of the anode cap 16, in case of reverse of the electrodes of the standard battery units, the standard battery units can not be loaded into the battery chamber properly.

Figure 23:
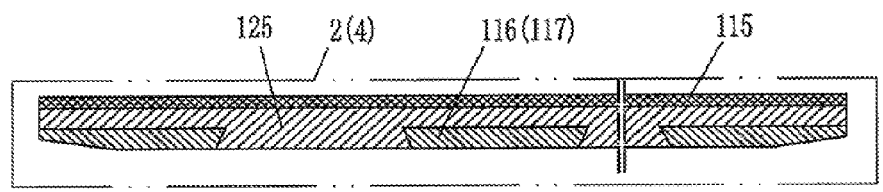
FIG. 23 is the structural schematic view of the electrode contact rails within the battery box of FIG. 22A.
Figure 24:
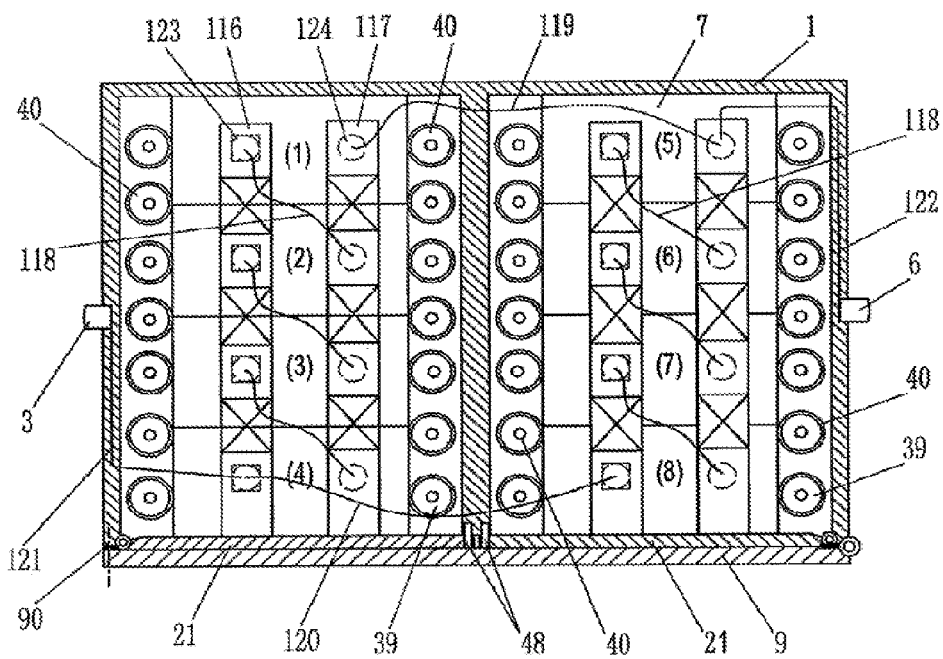
FIG. 24 is the schematic view of the wire connections between the electrode contact rails and the standard battery unit of FIG. 22A.

As shown in FIG. 24, it is explained in the present embodiment with an example that four rectangular standard battery units 7 with electrodes provided on the same side within each battery chamber on how to connect the standard battery units in the same chamber in series at first and then connect the serially connected battery packs in two battery chambers in parallel. Electrode contact rails formed by embedding copper lugs into insulating bakelite 125 as shown in FIG. 23 are used, an elastic rubber layer 115 is provided above the bakelite 125, such that the electrode contact rails are continuously provided in the battery box, and as of the arrangement of the elastic rubber layer 115, it may withstand a small range of deviation of the heights of the battery electrodes. It has to be pointed out that, the electrode contact rail as shown for contacting the anodes 123 of the standard battery units is the anode contact rail 2, wherein the copper lugs are the small segments 116 of the anode contact rail; and the electrode contact rails for contacting the cathodes 124 of the standard battery units is the cathode contact rail 4, wherein the copper lugs are the small segments 117 of the cathode contact rail. It also has to be noted that, for simplicity, in FIG. 24, the segments of the electrode contact rail without copper lugs are marked with "x", such that the standard battery unit (1), standard battery unit (2), the standard battery unit (3) and the standard battery unit (4) in the battery chamber are connected in series via wires 118 interweaving between the small segments 116 of the anode contact rail and the small segments 117 of the cathode contact rail to form a first battery pack; similarly, the standard battery unit (5), standard battery unit (6), the standard battery unit (7) and the standard battery unit (8) in the other battery chamber are connected in series to form a second battery pack, the first battery pack and the second battery pack are then connected in parallel via a wire 119 and a wire 120. After that, it is connected to the anode output port 3 via a wire 121 and to the cathode output port 6 via a wire 122. Of course, based on such technical principle, in practical applications, according to actual needs, the number of the standard battery units may be increased or decreased, the battery box with proper size and volume of the battery chambers may be used, and different arrangement of the anode contact rail and the cathode contact rail in segments as well as the series or parallel circuits may be used, to meet different needs.

It has to be pointed out that, the block plus circle representing the anode of the standard battery unit and the circle representing the cathode of the standard battery unit are merely used for simplicity, which does not represent the actual shapes of the respective electrodes.

Figure 25:
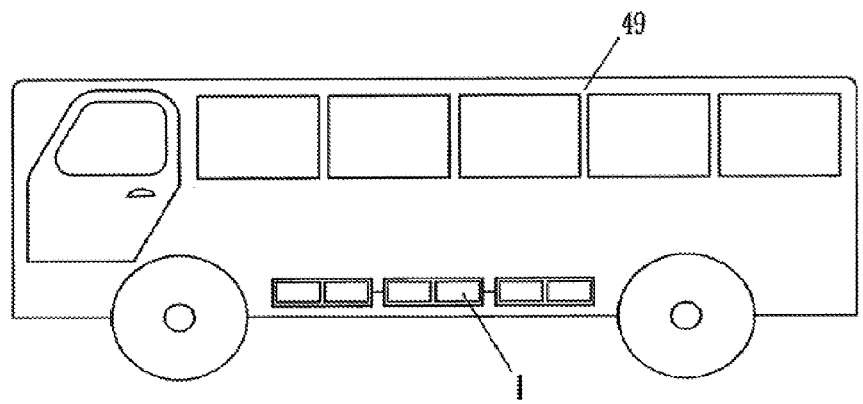
FIG. 25 is the schematic view of the application of the battery box according to the present invention of FIG. 22A.

The specific application is described below in conjunction with an example wherein the standard battery units 7 are rectangular lead-acid batteries. When applied to an electric bus, as shown in FIG. 25, the rechargeable battery pack formed by assembling three sets of the battery boxes and the standard battery units of the present embodiment together is provided in advance at the position L of the electric bus. The electric bus is powered by connecting the output ports 3 and 6 to the circuits of the driving devices of the electric vehicles. As existing low-to-medium voltage batteries are used in the present invention, three rechargeable battery packs may be connected in series to reach the relatively large nominal working voltage of the electric bus. No additional drawings are provided as of the simple principle of the serial circuits. The electric bus 49 in need of electric power supply is driven into the power exchange station to replace the drained standard battery units in the battery box with fully-charged standard battery units upon payment, the process comprises the following steps:

1) the electric bus is driven into the power exchange dock of the power exchange station; the driver orders standard battery units to be replaced according to model and number of the standard battery units needed. The protection cover 9 is opened, and the battery box is switched to a replacement state, at the same time releasing the locking means 48, and the mobile stop 21 is turned to release the positional locking of the standard battery units within the battery box 7;

2) the recovery port of the battery replacement device is docked to the inlet and outlet port of the battery box of the electric vehicle, the standard battery units in the battery box are unloaded one by one through the inlet and outlet port of the battery box, then the loading port of the battery replacement device is docked to the inlet and outlet port of the battery box of the electric vehicle, the fully charged standard battery units are loaded through the inlet and outlet port of the battery box according to the ordered model and number of the standard battery units. As of two battery chambers provided, the standard battery units in the two battery chambers are unloaded and loaded simultaneously to increase the efficiency;

3) the model, number and price of the standard battery units being loaded are displayed on the battery replacement device synchronously;

4) after the replacement of the drained standard battery units in the battery box, the battery replacement device is removed, the mobile stop 21 is secured relative to the battery box body by means of the locking means 48, the standard battery units in the battery pack are locked, the protection cover 9 is fixed again, and the electric power supply to the electric vehicle is completed;

5) the standard battery units are in proper contact with the electrode contact rails after entering into the battery box and being locked in position, and achieve a battery pack nominal voltage and a battery pack capacity as needed through the combinations of the electrode contact rails;

6) during the above period the driver pays for the batteries according to the ordered number of the batteries to be replaced or the driver pays according to the actual number of the replaced batteries displayed;

7) the drained standard battery units being replaced are transferred to charging room for recharging, and the fully-charged standard battery units are transferred to the battery storeroom for further use.

It has to be noted that, in the loading and unloading driving mechanism, other than sprocket drive mechanism, belt drive mechanism, pinion-rack drive mechanism, worm-gear drive mechanism, or ball screw mechanism may also be used, with same effects.

Figure 26:
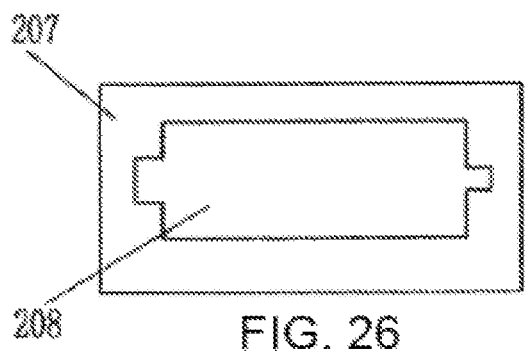
FIG. 26 is the schematic view of the baffle provided at the inlet of the battery chamber.

In addition, based on the automatic identification error-proof principle for the electrodes of the present invention, a baffle 207 as shown in FIG. 26 may be provided at the inlet of the battery chamber as the automatic identification error-proof device for the electrodes. A through hole 208 slightly larger than the size of the profile of the standard battery unit is provided on the baffle 207, the anode of the standard battery unit can not pass through from the side corresponding to the cathode as of the relatively larger size, therefore it can only be loaded into the battery chamber in the correct direction.

Seventeenth Embodiment

Figure 27:
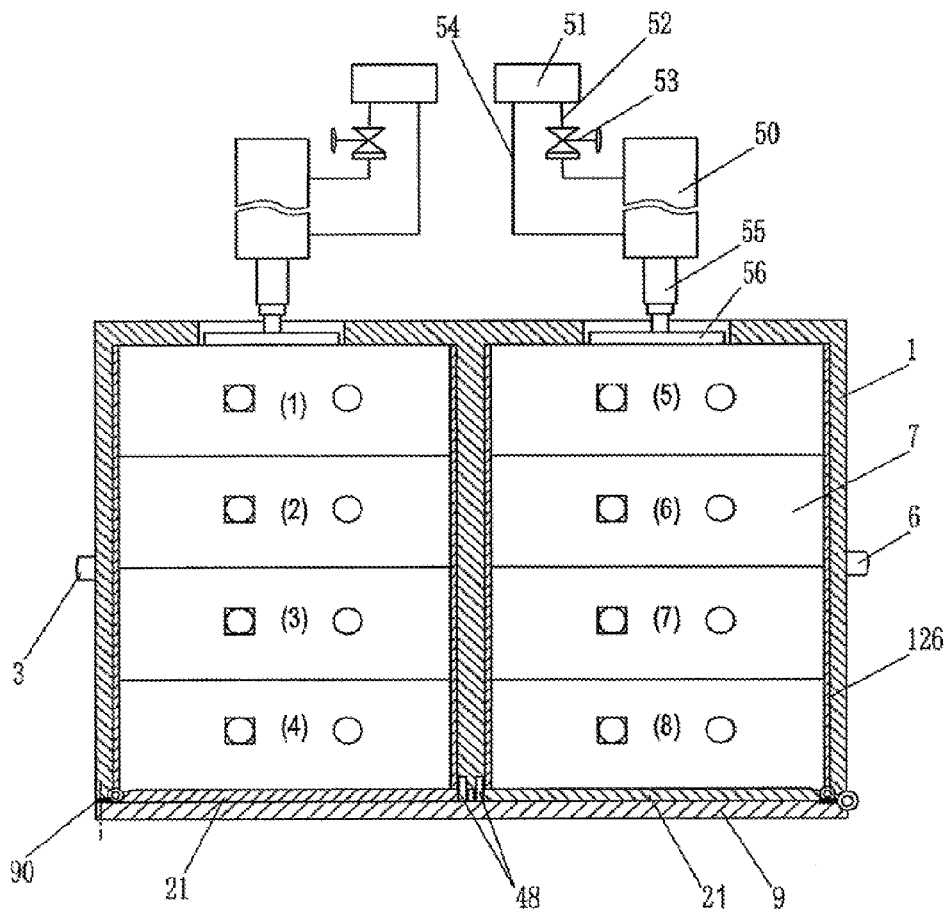
FIG. 27 is the seventh structural schematic view of the battery box according to the present invention.

As shown in FIG. 27, the difference between the battery box of the present embodiment and that of the sixteenth embodiment is that, the battery driving mechanism comprises a control system 51, a control valve 53, a cylinder 50, an air inlet pipe 54 and air return pipe 52. The protection cover 9 and the mobile stop 21 are opened to unlock the batteries, the cylinder 50 is driven by the control system, causing the piston 55 to extend forward with the baffle 56, thereby retracting the batteries 7 from the battery chamber. In addition, in order to facilitate movement of the standard battery units 7 within the battery chamber, guiding rails 126 are provided on the battery box corresponding to the sides of the standard battery units in the battery chamber, wherein the guiding rails 126 act as slide guides formed by smooth engineering plastic plates.

It is explained in the present embodiment in conjunction with an example of a cylinder. Based on the technical principle of the present embodiment, devices such as a hydraulic tank may be used to retract the batteries. In addition, based on the different positions of the cylinder or other driving mechanisms, other than being pushed out from the battery chamber, the batteries may also be pulled out of the battery chamber, with same effects. As the battery driving mechanism of the present embodiment does not take the inner space of the battery chamber, the structure of the battery box is since more compact and taking less space.

In addition, as of the increasing popularity as well as decreasing prices of the linear motor, it is one of the most ideal driving means. The linear motor driving mechanism comprises a linear motor, a linear guiding rail, a control system and a baffle 56, with the advantages of saving space, quick response and convenient control.

Eighteenth Embodiment

Figure 28A:
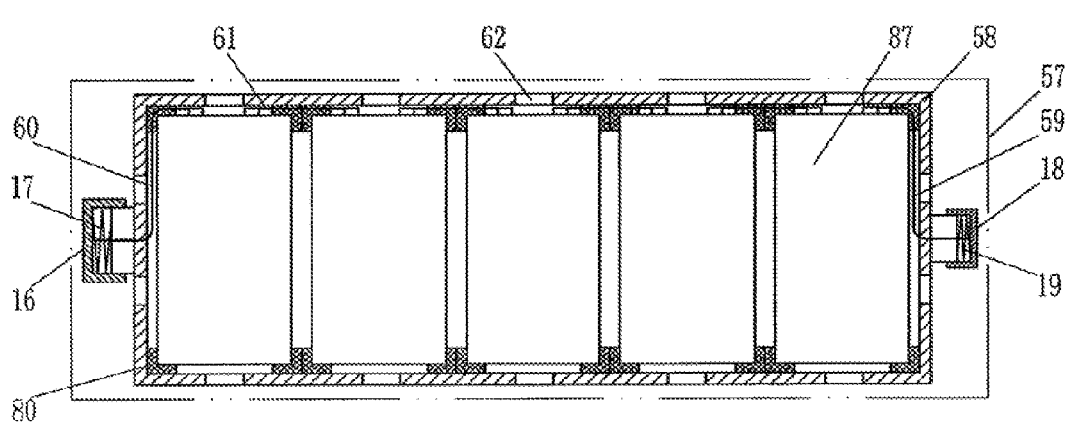
FIG. 28A is the structural schematic view of the standard battery unit according to the present invention.

As shown in FIG. 28A and FIG. 28B, the standard battery unit 57 of the present invention comprises a plurality of rectangular elementary battery units 87 connected in series via a wire 61 and disposed in a rectangular standard enclosure 58 not to be dissembled during operation. Electrodes including elastic extension structures are provided on the standard enclosure 58, wherein the elastic extension structure of the anode comprises a spring 17 and an electrode cap 16, and the elastic extension structure of the cathode comprises a spring 19 and an electrode cap 18, wherein the anode and the cathode are connected with the elementary battery units 87 on the two sides via a wire 60 and a wire 59 respectively, forming the standard battery unit 57. To facilitate heat dissipation, a plurality of through holes 62 is provided on the standard enclosure 58. In addition, to prevent damages due to accidental shocks to the elementary battery units during operation, elastic cushion pad layers 80 (made of rubber in the present embodiment) are provided on the elementary battery units 87. In addition to cushion and absorbing vibration, the elastic cushion pad layers 80 also function to resist wear. In addition, as of the elastic cushion pad layers 80 provided on the elementary battery units 87, there are gaps between the elementary battery units 87. These gaps, together with the through holes 62, form many channels in communication with the external environment, thereby facilitating heat dissipations of the standard battery unit 57.

As shown in FIG. 29A and FIG. 29B, the battery box body 1 of the battery box of the present embodiment is a frame structure formed by connecting light weight aluminum sections together. Three battery chambers 101 for accommodating a plurality of standard battery units 57 are provided in the battery box body 1 and connected in parallel via wires 63. The profile of the battery box body 1 around the battery chambers forms guiding rails 8 (slide guiding rails in the present embodiment) along the loading direction of the batteries 57. Electrode contact rails in direct contact with the electrodes of the standard battery units 57 are provided on the sides of the battery loading direction within the battery chamber. The electrode contact rails comprise an anode contact rail 2 and a cathode contact rail 4, with the anode and cathode contact rails in the same structure as those described in FIG. 23. An output port 3 for connecting with the external circuit is provided on the anode contact rail 2, and an output port 6 for connecting with the external circuit is provided on the cathode contact rail 4. In the present embodiment, the output port 3 and the output port 6 are both standard power plug-ins. The electric vehicles may be powered for operation by connecting the output ports 3 and 6 with the external power device. A mobile stop 64 provided at the inlet and outlet port end of the battery chamber and controlled by a rocker mechanism is provided on the battery box, and may protrude into the battery chamber 101 through a through hole 66 provided on the battery box body 1. In order to facilitate heat dissipation, through holes 65 in communication with the external space are provided on the battery box body 1. In addition, the battery box of the present embodiment also includes a cooling system. The cooling system is a circulating heat dissipation pipeline comprising a heat absorption part 23, a heat dissipation part 26, a circulating link conduit 24 and a power circulating pump 25, wherein a cooling medium is filled within the circulating heat dissipation pipeline, the power circulating pump 25 drives the circulation of the cooling medium, and the heat absorption part 23 is disposed in a cavity contained by the aluminum sections around the batteries 7. The cooling medium takes away heat in the battery box while being driven to the heat absorption part to cool the batteries, the heat dissipation part 26 is in contact with external flowing air, and the cooling medium after absorbing heat dissipates the heat to the air while being driven to the heat dissipation part. The cooled cooling medium is returned to the heat absorption part via the circulating link conduit to start a next cycle.

Figure 30:
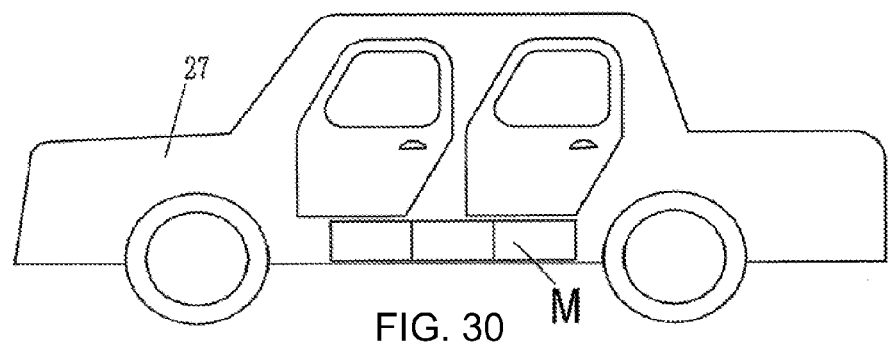
FIG. 30 is the schematic view of the application of the battery box according to the present invention of FIG. 29A.

The description is provided below in conjunction with an example wherein iron oxide-lithium batteries each with a nominal voltage of 3.3V and a nominal capacity of 60 A·h as the elementary battery units 87 constitute a standard battery unit 57. The nominal working voltage of the current electric cars is typically around 300V, with an electricity consumption of around 15 kWh per 100 km. As shown in FIG. 28A, five iron oxide-lithium batteries each with a nominal voltage of 3.3V and a nominal capacity of 60 A·h are connected in series and disposed into a standard enclosure 58 to form a standard battery unit 57; and a single standard battery unit has a voltage of 16.5V and a capacity of 60 A·h. The standard battery units 57 are disposed in the battery box as shown in FIG. 29A, 20 standard battery units are provided in each of the battery chambers, and the 20 standard battery units 57 are connected in series by preset wires. As of the detailed description in the sixteenth embodiment on how to connect the plurality of standard battery units in the battery chamber in series and how to connect the serially connected battery packs in different battery chambers in parallel, no additional drawings are provided for explanation in the present embodiment. The voltage of the serially connected standard battery units in each of the battery chambers according to the above method is 330V, and the total capacity of the three battery chambers connected in parallel is 180 A·h. The total energy of the rechargeable battery pack comprising the battery box and the standard battery units of the present embodiment is 59.4 kWh. That is, the electric vehicle may continuously run about 400 km with one charge based on an estimated average electricity consumption of 15 kWh per 100 km of the current electric vehicles. When applied to the electric car 27, as shown in FIG. 30, the above rechargeable battery packs may be provided at the position M of the electric cars in advance. The electric car 27 in need of electric power supply is driven into a power exchange station to replace the drained standard battery units in the battery box with fully charged standard battery units upon payment. The electric power supply process differs from that of the sixteenth embodiment only in the releasing and restoring operation of the positional locking of the standard battery units 57 within the battery box. A mobile stop controlled by a rocker mechanism is used in the present embodiment, the release or restoration of the positional locking of the standard battery units is since realized by rotating the rocker 110.

This type of standard battery units of the present embodiment is usually of low voltage, and since safer compared to the large storage batteries used in the prior art. For example, the nominal voltage of the standard battery unit 57 as used in the present embodiment is only 16.5V, significantly lower than the human safety voltage of 36V. The risk of electric shock is since greatly decreased when using the standard battery unit of the present invention, ensuring the personal safety during the operation. In addition, compared to full voltage large batteries, it is more convenient to be disposed in complex-shaped battery boxes, thereby fully utilizing the available space in the electric vehicles; and compared to the elementary battery unit, it is more convenient to further decrease the electric energy supply time of the electric vehicles (battery replacement time).

It has to be pointed out that, the present embodiment is described in conjunction with the standard battery unit comprising five serially connected elementary battery units. In practical applications, based on different working voltages needed, or different capacities of the rechargeable battery packs, or the performances of the batteries being used, the numbers of the elementary battery units constituting the standard battery unit and the connection therebetween may vary. For example, other than serial connection between the elementary batteries, parallel connection or a combination of serial connection and parallel connection may also be used. In addition, the present embodiment is described in conjunction with three battery chambers in parallel connection provided in the battery box, however, in practical applications, based on actual needs, less or more than three battery chambers may be provided, and the number of the standard battery units in the battery chamber and the connection between the battery chambers may vary. In addition, the battery chambers may also be provided at different positions of the electric vehicles separately.

Nineteenth Embodiment

Figure 31:
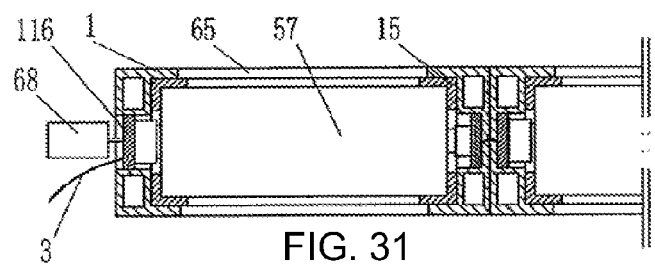
FIG. 31 is the ninth structural schematic view of the battery box according to the present invention.

As shown in FIG. 31, the difference between the battery box of the present embodiment and the eighteenth embodiment is that, a small segment 116 of the anode contact rail connecting with the output port 3 of the anode contact rail 2 is connected with the cylinder 68. During electric power supply, when the rocker is rotated to move the mobile stop out of the battery chamber, the cylinder moves simultaneously to move the small segment 116 of the anode contact rail connected with the output port 3 away from the electrode of the standard battery unit 57. In such way, the power supply circuit of the whole battery box is shut down, preventing accidents of electric shocks during electric energy supply, and making the procedure safer. Upon completion of the electric power supply, when the rocker is rotated to move the mobile stop into the battery chamber to re-lock the standard battery units, the cylinder moves simultaneously to re-engage the small segment 116 of the anode contact rail connected with the output port 3 with the electrode of the battery unit 57. It has to be pointed out that the power of the cylinder is supplied by another rechargeable storage battery (not shown).

Of course, other than the technical solution of moving the electrode contact rail relative to the electrode of the battery, the one of rotating the electrode contact rail relative to the electrode of the battery may also be adopted, with the same effects, as long as the power supply to the whole battery box is shut down. And the embodied devices comprise other electric, hydraulic or mechanical devices other than the cylinder, details being not provided herein.

Twentieth Embodiment

Figure 32:
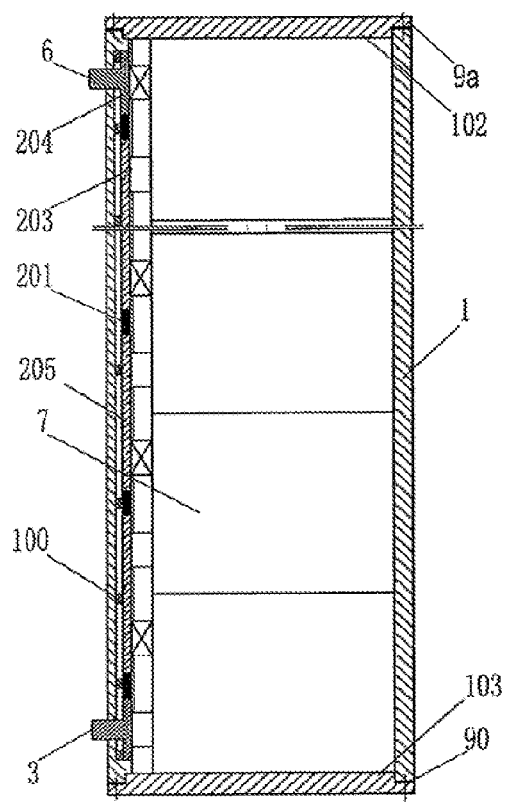
FIG. 32 is the tenth structural schematic view of the battery box according to the present invention.

As shown in FIG. 32, the difference between the battery box of the present embodiment and that of the first embodiment is that, only one electrode contact rail disposed on the side of the standard battery loading direction in the battery chamber is provided, with the rail comprising spaced metal conductive segments 205 and insulating segments 201 and being continuous. Elastic elements are provided between the electrode contact rail and the battery box body 1, and the elastic elements are embodied as elastic polyurethane pads 100. By way of example, in the electrode contact rail of the battery box of the present embodiment, the metal conductive segments 205 act both as an anode contact rail and a cathode contact rail. As shown in FIG. 32, when rectangular standard battery units 7 with electrodes on the same side are provided in the battery chamber, upon correct positioning of the batteries, all of the standard battery units are connected in series via the metallic conductive segments 205. The metallic conductive segments 205 arranged at the both ends of the electrode contact rail are also connected to the anode output port 3 and the cathode output port 6 in addition to being connected to the electrodes of the standard battery units respectively, thereby forming a power supply circuit of the whole battery pack. For simple illustration, as shown in FIG. 32, cross marks are used to distinguish the anode 203 and the cathode 204 of the standard battery units.

The battery box of such structure may simplify the internal structure of the battery box by omitting wire connection, thus taking a less space and of more practicability.

What is claimed is:

1. A battery box, comprising:
a battery box body, wherein at least one battery chamber capable of accommodating a plurality of standard battery units is provided in the battery box body;
guiding rails provided along a battery loading direction in the battery chamber;
a battery locating mechanism provided in the battery box; and
electrode contact rails directly contacting electrodes of the standard battery units provided at sides of the battery loading direction in the battery chamber, said electrode contact rails comprising an anode contact rail and a cathode contact rail, wherein at least one electrode contact rail is provided at a side of the battery loading direction, at a position corresponding to at least one electrode of a standard battery unit, and wherein at least one anode contact rail and at least one cathode contact rail are provided with an output port for connecting to an external circuit, or are connected with an output port for connecting to the external circuit.

2. A battery box according to claim 1, characterized in that a plurality of anode contact rails and/or cathode contact rails are provided, and connected with each other via fixed serial and/or parallel circuits.

3. A battery box according to claim 1, characterized in that a battery inlet and a battery outlet are provided at two ends of each of the battery chambers in the battery box respectively.

4. A battery box according to claim 1, characterized in that only one common inlet and outlet port for loading and unloading the standard battery units is provided in one and the same battery chamber in the battery box.

5. A battery box according to claim 3, characterized in that an openable protection cover is provided at the battery inlet, the battery outlet or the battery inlet and battery outlet port of the battery chamber, with a sealing element or a sealing structure provided between the protection cover and the battery box body.

6. A battery box according to claim 1, characterized in that at least one electrode contact rail in each of the battery chambers is made of a good conductor with flexural resilience in the direction of contacting with the electrodes of the standard battery units, and is connected to the battery box body through a softer elastic material.

7. A battery box according to claim 1, characterized in that at least one electrode contact rail in each of the battery chambers is made of a relatively rigid good conductor, and an elastic element is provided between the electrode contact rail and the battery box body.

8. A battery box according to claim 1, characterized in that the electrode contact rail is movable or rotatable relative to an electrode of a standard battery units.

9. A battery box according to claim 1, characterized in that the guiding rails include a slide guiding rail or a rolling guiding rail.

10. A battery box according to claim 9, characterized in that the rolling guiding rail comprises rollers, or comprises rollers and a guiding conveyor belt.

11. A battery box according to claim 9, characterized in that the guiding rails include a guiding strip fixed within the battery chamber, or concave-convex guiding structures provided on the side wall of the battery box body.

12. A battery box according to claim 9, characterized in that an elastic cushion vibration-absorption pad layer is provided between the guiding rail and the battery box body.

13. A battery box according to claim 9, characterized in that a driving mechanism for loading and unloading the standard battery units is provided in the battery box.

14. A battery box according to claim 13, characterized in that the loading and unloading driving mechanism comprises a control system, a driving motor, a deceleration device and a transmission device, the transmission device including a belt drive mechanism, a sprocket drive mechanism, a rack-pinion drive mechanism, a worm-gear drive mechanism or a ball screw drive mechanism.

15. A battery box according to claim 13, characterized in that the driving mechanism for loading and unloading the standard battery units comprises a control system, a control valve and a cylinder or hydraulic tank.

16. A battery box according to claim 1, characterized in that the battery locating mechanism is a controllable mobile stop that may protrude into and retract from the battery chamber.

17. A battery box according to claim 1, characterized in that a cooling system is provided in or around the battery box.

18. A battery box according to claim 17, characterized in that the cooling system is an air cooling channel with an air inlet and an air outlet, a replaceable or cleanable filter is provided on the air inlet, and ventilation sub-channels are provided around the standard battery units and connected to external fresh air via the air cooling channel, an air blower is provided in the air cooling channel to obtain a forcible ventilation, or a dynamic pressure air collecting port using pneumatic pressure from a vehicle traveling as an air flow driving force is provided at the air inlet of the air cooling channel.

19. A battery box according to claim 17, characterized in that the cooling system is a circulating heat dissipation pipeline, comprising a heat absorption part, a heat dissipation part, a circulating link conduit and a power circulating pump, wherein a cooling medium is filled within the circulating heat dissipation pipeline, the heat absorption part is disposed around the standard battery units or in contact with outer walls of the standard battery units, and the heat dissipation part contacts external flowing air or a heat dissipation enclosure.

20. A battery box according to claim 17, characterized in that the cooling system is a gravity heat-pipe comprising an evaporation part, a condensation part, an ascending conduit and a descending conduit, wherein at least one of the evaporation part and the condensation part comprises a plurality of rack conduits in communication with each other, a low boiling point medium is filled within the rack conduits, the evaporation part is in close contact with the standard battery units, or in contact with the standard battery units via a good conductor, or provided around the standard battery units, the condensation part is provided above the evaporation part and in communication with the evaporation part via the ascending conduit and the descending conduit, the condensation part is located in externally flowing air or contacts a heat dissipation enclosure comprising at least a portion of an enclosure of an electric vehicle body or at least a portion of an enclosure of the battery box body contacting the external flowing air.

21. A battery box according to claim 1, characterized in that an automatic identification error-proof device of the electrodes of the standard battery units is provided in the battery chamber.

22. A battery box according to claim 4, characterized in that an openable protection cover is provided at the inlet, the outlet or the inlet and outlet port of the battery chamber, with a sealing element or a sealing structure provided between the protection cover and the battery box body.

* * * * *